US012739639B2

(12) United States Patent
Bergström et al.

(10) Patent No.: US 12,739,639 B2
(45) Date of Patent: Sep. 15, 2026

(54) PROTECTION OF BAP TRANSMISSIONS

(71) Applicant: Telefonaktiebolaget LM Ericsson (publ), Stockholm (SE)

(72) Inventors: Mattias Bergström, Sollentuna (SE); Marco Belleschi, Solna (SE); Prajwol Kumar Nakarmi, Solna (SE); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 18/578,796

(22) PCT Filed: Jun. 30, 2022

(86) PCT No.: PCT/EP2022/068166

§ 371 (c)(1),
(2) Date: Jan. 12, 2024

(87) PCT Pub. No.: WO2023/016698

PCT Pub. Date: Feb. 16, 2023

(65) Prior Publication Data

US 2024/0323689 A1 Sep. 26, 2024

Related U.S. Application Data

(60) Provisional application No. 63/232,984, filed on Aug. 13, 2021.

(51) Int. Cl.
*H04W 12/106* (2021.01)

(52) U.S. Cl.
CPC .................................. *H04W 12/106* (2021.01)

(58) Field of Classification Search
CPC ...................................................... H04L 63/162
See application file for complete search history.

(56) References Cited

U.S. PATENT DOCUMENTS

| | | | | |
|---|---|---|---|---|
| 11,350,305 | B2 * | 5/2022 | Kim | H04W 72/27 |
| 11,856,401 | B2 * | 12/2023 | Jactat | H04W 12/106 |
| 2020/0221329 | A1 * | 7/2020 | Kim | H04W 12/037 |

(Continued)

FOREIGN PATENT DOCUMENTS

| | | | |
|---|---|---|---|
| WO | 2020174291 | A1 | 9/2020 |

OTHER PUBLICATIONS

Suomalainen et al., "Securing Public Safety Communications on Commercial and Tactical 5G Networks: A Survey and Future Research Directions", n IEEE Open Journal of the Communications Society, vol. 2, pp. 1590-1615, (Year: 2021).*

(Continued)

*Primary Examiner* — Morshed Mehedi
(74) *Attorney, Agent, or Firm* — Sage Patent Group

(57) ABSTRACT

A method performed by a first node includes obtaining a configuration for performing backhaul integrity protection and verification for backhaul adaptation protocol, BAP, data protocol data unit, PDU, packets transmitted and/or received over a backhaul link. The method includes computing a security token to be included in a BAP data PDU to be transmitted. The method includes adding the security token in the BAP data PDU. The method includes transmitting the BAP data PDU with the security token towards a second IAB node.

16 Claims, 15 Drawing Sheets

(56) References Cited

U.S. PATENT DOCUMENTS

2021/0112415 A1* 4/2021 Lee ........................ H04L 69/40

OTHER PUBLICATIONS

Gonzalez-Diaz et al., "Integrating Fronthaul and Backhaul Networks: Transport Challenges and Feasibility Results," in IEEE Transactions on Mobile Computing, vol. 20, No. 2, pp. 533-549, Feb. 1, 2021.*

International Search Report and Written Opinion of the International Searching Authority, PCT/EP2022/068166, mailed Oct. 6, 2022, 17 pages.

Samsung, "BAP header protection for IAB," 3GPP TSG-RAN2#106, R2-1906735 (Revision of R2-1904680), Reno, USA, May 13-17, 2019, 2 pages.

Ericsson, "IAB: Discussion on security of BH link," 3GPP TSG-SA3 Meeting #104e-Adhoc, S3-213464, e-meeting, Sep. 27-30, 2021, 4 pages.

3GPP TS 38.473 V16.0.0 (Dec. 2019); 3rd Generation Partnership Project; Technical Specification Group Radio Access Network; NG-RAN; F1 application protocol (F1AP) (Release 16), 239 pages.

3GPP TS 38.331 V16.5.0 (Jun. 2021); 3rd Generation Partnership Project; Technical Specification Group Radio Access Network; NR; Radio Resource Control (RRC) protocol specification (Release 16), 959 pages.

3GPP TS 33.501 V16.7.1 (Jun. 2021); 3rd Generation Partnership Project; Technical Specification Group Services and System Aspects; Security architecture and procedures for 5G system (Release 16), 255 pages.

* cited by examiner

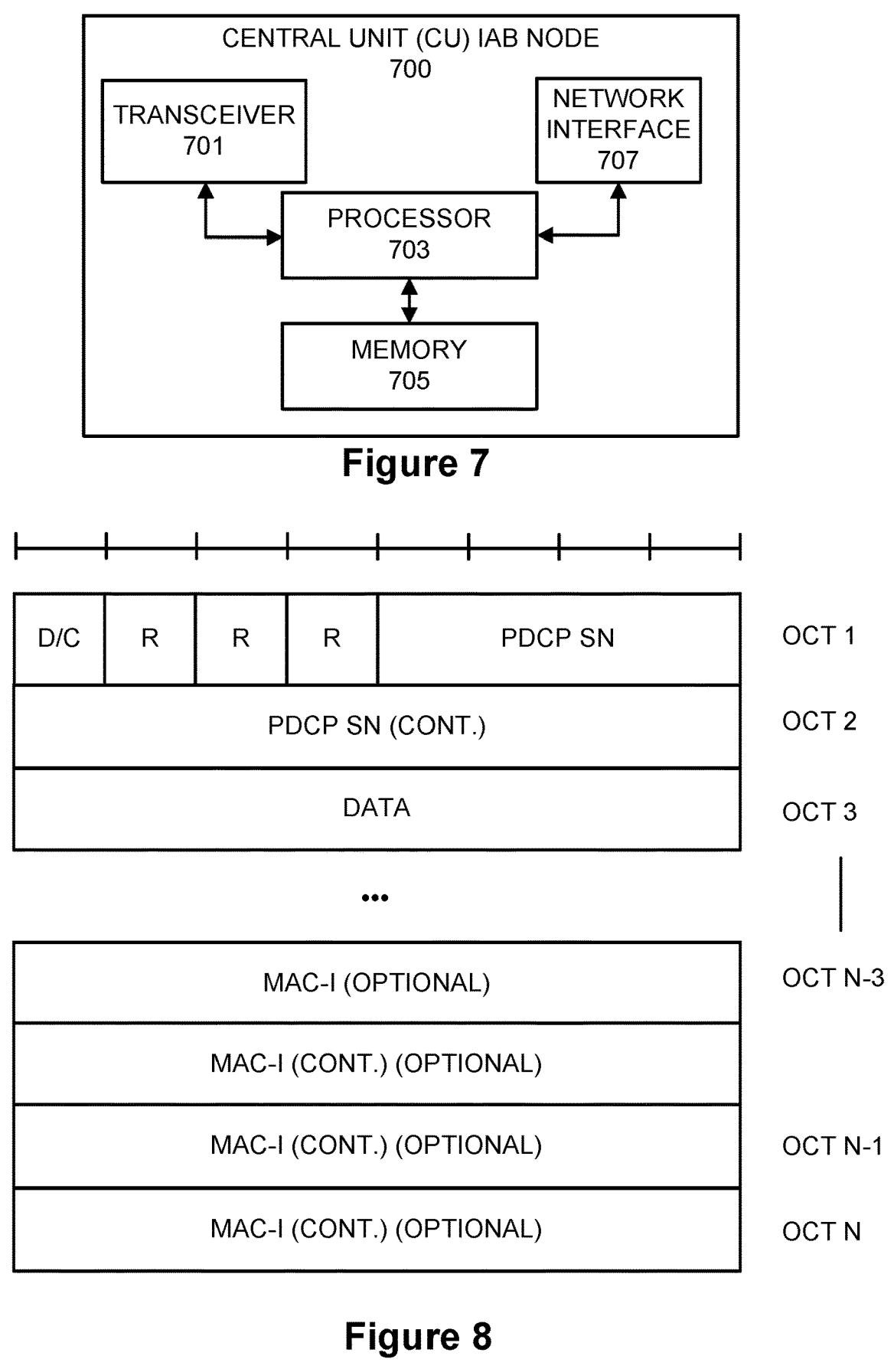

CENTRAL UNIT (CU) IAB NODE 700

TRANSCEIVER 701

NETWORK INTERFACE 707

PROCESSOR 703

MEMORY 705

Figure 7

| D/C | R | R | R | PDCP SN | OCT 1 |
|---|---|---|---|---|---|
| PDCP SN (CONT.) | | | | | OCT 2 |
| DATA | | | | | OCT 3 |
| ... | | | | | |
| MAC-I (OPTIONAL) | | | | | OCT N-3 |
| MAC-I (CONT.) (OPTIONAL) | | | | | |
| MAC-I (CONT.) (OPTIONAL) | | | | | OCT N-1 |
| MAC-I (CONT.) (OPTIONAL) | | | | | OCT N |

Figure 8

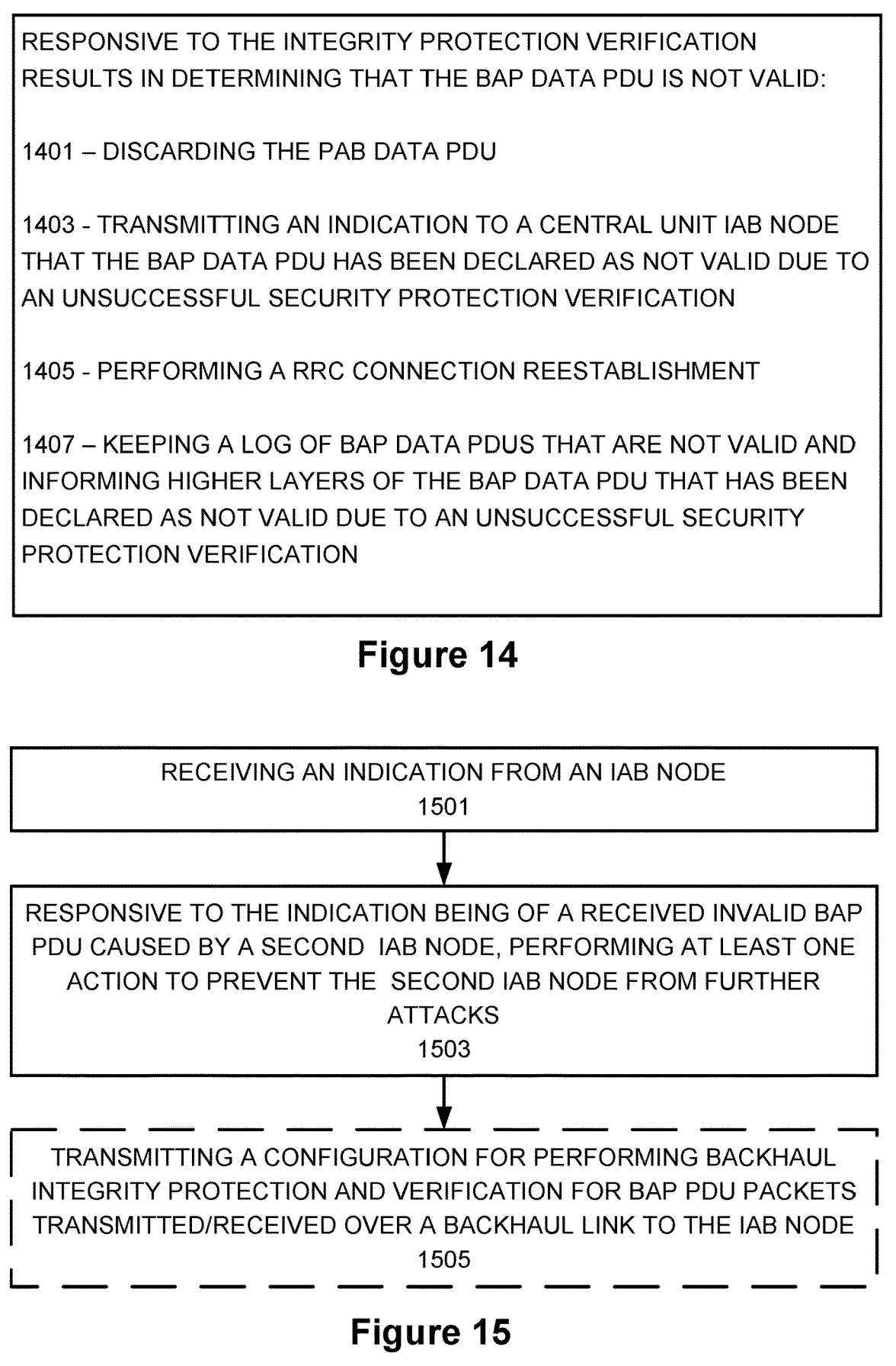

RESPONSIVE TO THE INTEGRITY PROTECTION VERIFICATION RESULTS IN DETERMINING THAT THE BAP DATA PDU IS NOT VALID:

1401 – DISCARDING THE PAB DATA PDU

1403 - TRANSMITTING AN INDICATION TO A CENTRAL UNIT IAB NODE THAT THE BAP DATA PDU HAS BEEN DECLARED AS NOT VALID DUE TO AN UNSUCCESSFUL SECURITY PROTECTION VERIFICATION

1405 - PERFORMING A RRC CONNECTION REESTABLISHMENT

1407 – KEEPING A LOG OF BAP DATA PDUS THAT ARE NOT VALID AND INFORMING HIGHER LAYERS OF THE BAP DATA PDU THAT HAS BEEN DECLARED AS NOT VALID DUE TO AN UNSUCCESSFUL SECURITY PROTECTION VERIFICATION

Figure 14

RECEIVING AN INDICATION FROM AN IAB NODE
1501

RESPONSIVE TO THE INDICATION BEING OF A RECEIVED INVALID BAP PDU CAUSED BY A SECOND IAB NODE, PERFORMING AT LEAST ONE ACTION TO PREVENT THE SECOND IAB NODE FROM FURTHER ATTACKS
1503

TRANSMITTING A CONFIGURATION FOR PERFORMING BACKHAUL INTEGRITY PROTECTION AND VERIFICATION FOR BAP PDU PACKETS TRANSMITTED/RECEIVED OVER A BACKHAUL LINK TO THE IAB NODE
1505

Figure 15

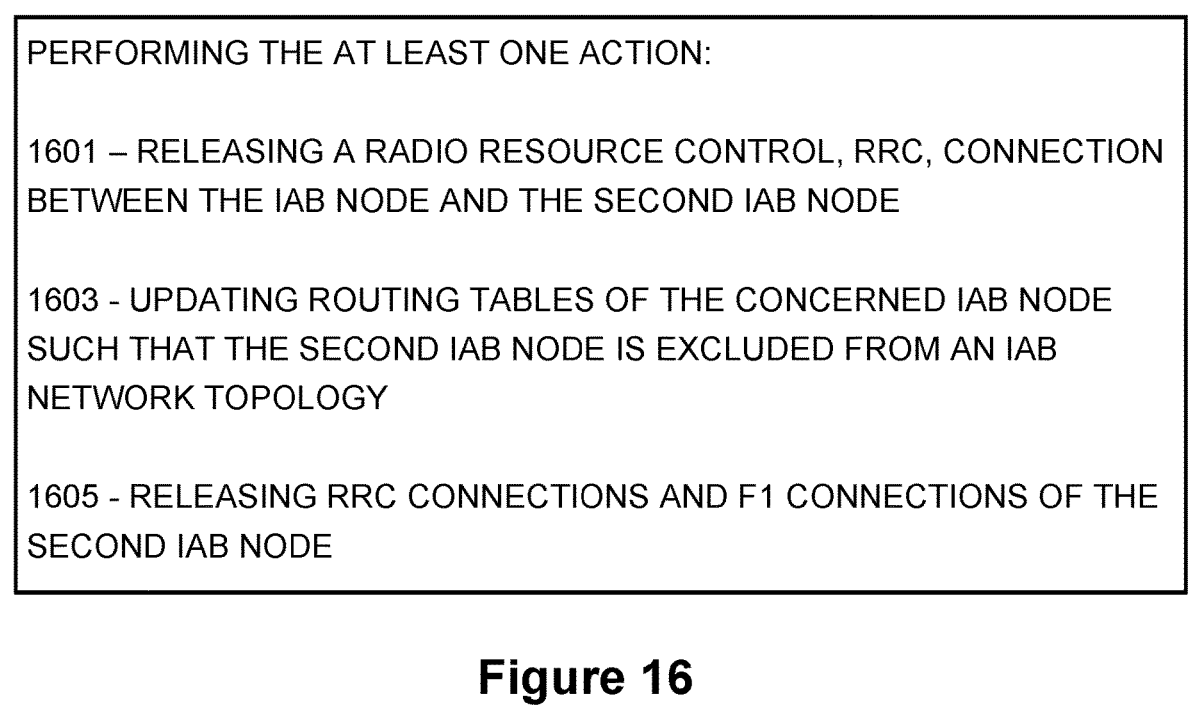

PERFORMING THE AT LEAST ONE ACTION:

1601 – RELEASING A RADIO RESOURCE CONTROL, RRC, CONNECTION BETWEEN THE IAB NODE AND THE SECOND IAB NODE

1603 - UPDATING ROUTING TABLES OF THE CONCERNED IAB NODE SUCH THAT THE SECOND IAB NODE IS EXCLUDED FROM AN IAB NETWORK TOPOLOGY

1605 - RELEASING RRC CONNECTIONS AND F1 CONNECTIONS OF THE SECOND IAB NODE

Figure 16

PROTECTION OF BAP TRANSMISSIONS

CROSS REFERENCE TO RELATED APPLICATIONS

This application is a 35 U.S.C. § 371 national stage application of PCT International Application No. PCT/EP2022/068166 filed on Jun. 30, 2022, which in turn claims domestic priority to U.S. Provisional Patent Application No. 63/232,984, filed on Aug. 13, 2021, the disclosures and content of which are incorporated by reference herein in their entirety.

TECHNICAL FIELD

The present disclosure relates generally to communications, and more particularly to how messages are communicated between integrated access and wireless access backhaul nodes.

BACKGROUND

The usage of short range mmWave spectrum in NR (new radio) creates a need for densified deployment with multi-hop backhauling. However, optical fiber to every base station will be too costly and sometimes not even possible (e.g., historical sites). The main IAB (integrated access backhaul) principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g., to residential/office buildings). The larger bandwidth available for NR in mmWave spectrum provides opportunity for self-backhauling, without limiting the spectrum to be used for the access links. On top of that, the inherent multi-beam and MIMO (multiple input multiple output) support in NR reduce cross-link interference between backhaul and access links allowing higher densification.

During the study item phase of the IAB work (summary of the study item can be found in the technical report TR 38.874), it has been agreed to adopt a solution that leverages the Central Unit (CU)/Distributed Unit (DU) split architecture of NR, where the IAB node will be hosting a DU part that is controlled by a central unit. The IAB nodes also have a Mobile Termination (MT) part that they use to communicate with their parent nodes.

The specifications for IAB strives to reuse existing functions and interfaces defined in NR. In particular, MT, gNB-DU, gNB-CU, UPF (user plane function), AMF (access and mobility management function) and SMF (session management function) as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The Mobile-Termination (MT) function has been defined as a component of the IAB node. In the context of this study, MT is referred to as a function residing on an IAB-node that terminates the radio interface layers of the backhaul Uu interface toward the IAB-donor or other IAB-nodes.

FIG. 1 shows a high-level architectural view of an IAB network. The baseline user plane and control plane protocol stacks for IAB are shown in FIGS. 2 and 3, respectively.

BAP (Backhaul Adaptation Protocol) Entities

As illustrated in FIGS. 2 and 3, the IAB node includes a new protocol layer defined as BAP (Backhaul Adaptation Protocol) on top of the classical RAN layers, i.e. PHY, MAC, RLC. On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link. Hence, from the above figures, it turns out that the PDCP (packet data convergence protocol) layer is not used for relaying purposes.

The BAP layer accomplishes several functions including functions such as:

- Transfer of data;
- Routing of packets to next hop;
- Determination of BAP destination and BAP path for packets from upper layers;
- Determination of egress BH RLC channels for packets routed to next hop;
- Differentiating traffic to be delivered to upper layers from traffic to be delivered to egress link;
- Flow control feedback signalling;
- BH RLF (radio link failure) indication.

The BAP layer has two types of protocol data unit (PDU): BAP Data PDU and BAP Control PDU. BAP Data PDU conveys upper layer data and BAP Control PDU conveys flow control feedbacks and RLF (radio link failure) indications. These two types of PDUs have different format.

When it comes to signaling (concerning the BAP Control PDU), the BAP layer has an important role in the hop-by-hop flow control. In particular, a child node can inform the parent node about possible congestions experienced locally at the child node, so that the parent node can throttle the traffic towards the child node. The parent node can also use the BAP layer to inform the child node in case RLF issues are experienced at the parent. Upon reception of such BH RLF indication, the child node can possibly reestablish its connection to another parent node.

When it comes to user plane data (concerning the BAP Data PDU), the BAP layer is fundamental to determine how to route a received packet. For the downstream user plane data, that implies determining whether the packet has reached its final destination, in which case the packet will be transmitted to UEs that are connected to this IAB node, or to forward it to another IAB node in the right path. In the first case, the BAP layer passes the packet to higher layers in the IAB node which are in charge of mapping the packet to the various QoS flows and hence data radio bearers, DRBs (which are included in the packet). In the second case, the BAP layer determines the proper egress BH RLC channel on the basis of the BAP destination, path IDs and ingress BH RLC channel. The above also applies to the upstream, with the only difference that the final destination is always one specific donor DU/CU.

In order to achieve the above tasks, the BAP layer of the IAB node has to be configured with a routing table mapping ingress RLC channels to egress RLC channels which may be different depending on the specific BAP destination and path of the packet. Hence, the BAP destination and path ID are included in the header of the BAP Data PDU packet so that the BAP layer can determine where to forward the packet. The BAP Data PDU format is illustrated in FIG. 4.

Integrity Protection

Integrity protection is a security mechanism that cryptographically ensures that an attacker cannot tamper the communication without the receiver noticing the tampering. On a high level, the sender includes some form of security token in the communication messages (e.g., message authentication code or digital signature) that is derived from the message and the receiver verifies that the security token is correct with respect to the received message.

In legacy operations, the integrity protection function is just designed for the Uu link and it has been recently extended also to the PC5 link for sidelink communications. No security mechanism is currently available in 3GPP standards for the BH link.

SUMMARY

There currently exist certain challenge(s), particularly with respect to BAP data PDU security. Security problems in IAB networks may arise from the fact that an attacker (e.g., with an attacking IAB node and acting as a BH relay), may deliberately disturb the routing table configured by the network. For example, such an attacking IAB node may be configured by the CU IAB node with a certain routing table. However, upon receiving a BAP Data PDU from the previous hop, it does not use the DESTINATION and PATH fields in the BAP header to derive the next hop and the egress BH RLC channel. Rather, it may transmit the BAP PDU to a not-intended IAB node (e.g., an IAB node that was not configured by the CU IAB node to be the next hop for the said DESTINATION/PATH pair) or even pass it to upper layers for delivery to UEs. Such a behavior may jeopardize the entire IAB topology and ultimately affect the end-users. For example, if a packet is routed by the attacking IAB node to a not-intended IAB node, such IAB node may be overloaded and unable to provide service (denial-of-service); it may not be able to recognize and map this DESTINATION/PATH fields to the configured routing table, and hence it may discard the packet.

The above attack can also occur if the attacker operates on its own (i.e., not a part of a legitimate network, and therefore not configured by the CU) and tampers the BAP header over-the-air using techniques like Man-in-the-Middle or signal overshadowing.

The above issue may be solved by enabling certain security functions at the IAB node. However, it is noted that the legacy 3GPP RAN security operates is just designed to operate over the Uu link, not over the BH link. In other words, the legacy 3GPP RAN security operates at PDCP level, and at SRB/DRB level.

In fact, the Message Authentication Code-Integrity (MAC-I) token is transmitted in the PDCP packet header, and the integrity protection function leverages on the bearer identifier associated to the SRB/DRB. Instead, an IAB node when performing relaying of packets to a next hop, i.e., to a parent IAB node (for the case of upstream traffic) or to a child IAB node (for the case of downstream traffic), does not handle packets via PDCP functionalities and those packets are not associated to DRBs/SRBs. Rather, the BAP layer is adopted instead of PDCP, and packets are associated to BH RLC channels instead of SRBs/DRBs.

This poses a challenge on how to prevent such type of attacks in the IAB network, and also how to identify the attacker.

Certain aspects of the disclosure and their embodiments may provide solutions to these or other challenges. Various embodiments of inventive concepts provide a method for an IAB node to perform the integrity protection and verification of the BH link for the BAP Data PDUs, wherein the BH integrity protection/verification differs from the Uu integrity protection functions that may be configured separately to the IAB node, and hence performed separately by the said IAB node depending on whether a packet has to be transmitted, or is received, to/from the BH link or other RAN interfaces (e.g., Uu).

In some of these various embodiments of inventive concepts, a method to generate at a transmitting IAB node, and verify at a receiving IAB node a token to enable integrity protection over the BH link for the Data PDUs is provided. Also provided is a method for a transmitting IAB node to include the generated token in the BAP Data PDU header, and actions for the receiving IAB node to handle a received BAP Data PDU upon security verification.

According to some embodiments, a method performed by a first node includes obtaining a configuration for performing backhaul integrity protection and verification for backhaul adaptation protocol, BAP, data protocol data unit, PDU, packets transmitted and/or received over a backhaul link. The method includes computing a security token to be included in a BAP data PDU to be transmitted. The method includes adding the security token in the BAP data PDU. The method includes transmitting the BAP data PDU with the security token towards a second IAB node.

Analogous IAB nodes, computer programs, and computer program products are also provided.

Certain embodiments may provide one or more of the following technical advantage(s). Tampered BAP Data PDUs will be identified by the receiver. This allows taking reactive action, e.g., ignoring the BAP Data PDU, not forwarding it to the destination, keeping logs, and informing another entity about the tampered PDU. This also saves the next destination to be overloaded with messages that was not meant for it.

Another advantage that may be achieved is an increase on overall robustness of the IAB system.

According to some other embodiments, a method performed by a central unit, CU, Integrated Access and Backhaul, IAB, node includes receiving an indication from an IAB node. The method includes responsive to the indication being of a received invalid BAP PDU caused by a second IAB node, performing at least one action to prevent the second IAB node from further attacks.

Analogous CU nodes, computer programs, and computer program products are also provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 7 is a block diagram illustrating a central unit integrated access and backhaul (IAB) node according to some embodiments of inventive concepts;

FIG. 8 is an illustration of a PDCP (physical downlink control protocol) Data PDU format with 12 bits PDCP SN and MAC-I according to some embodiments;

FIGS. 12-14 are flow charts illustrating operations of an IAB node according to some embodiments of inventive concepts;

FIGS. 15-16 are flow charts illustrating operations of a central IAB node according to some embodiments of inventive concepts;

DETAILED DESCRIPTION

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

As previously indicated, tampered BAP Data PDUs will be identified by the receiver. This allows taking reactive action, e.g., ignoring the PDU, not forwarding it to the said destination, keeping a log, and informing another entity about the tampered PDU. This also saves the next destination in the communication path from being overloaded with messages that were not meant for it.

Figure 1:
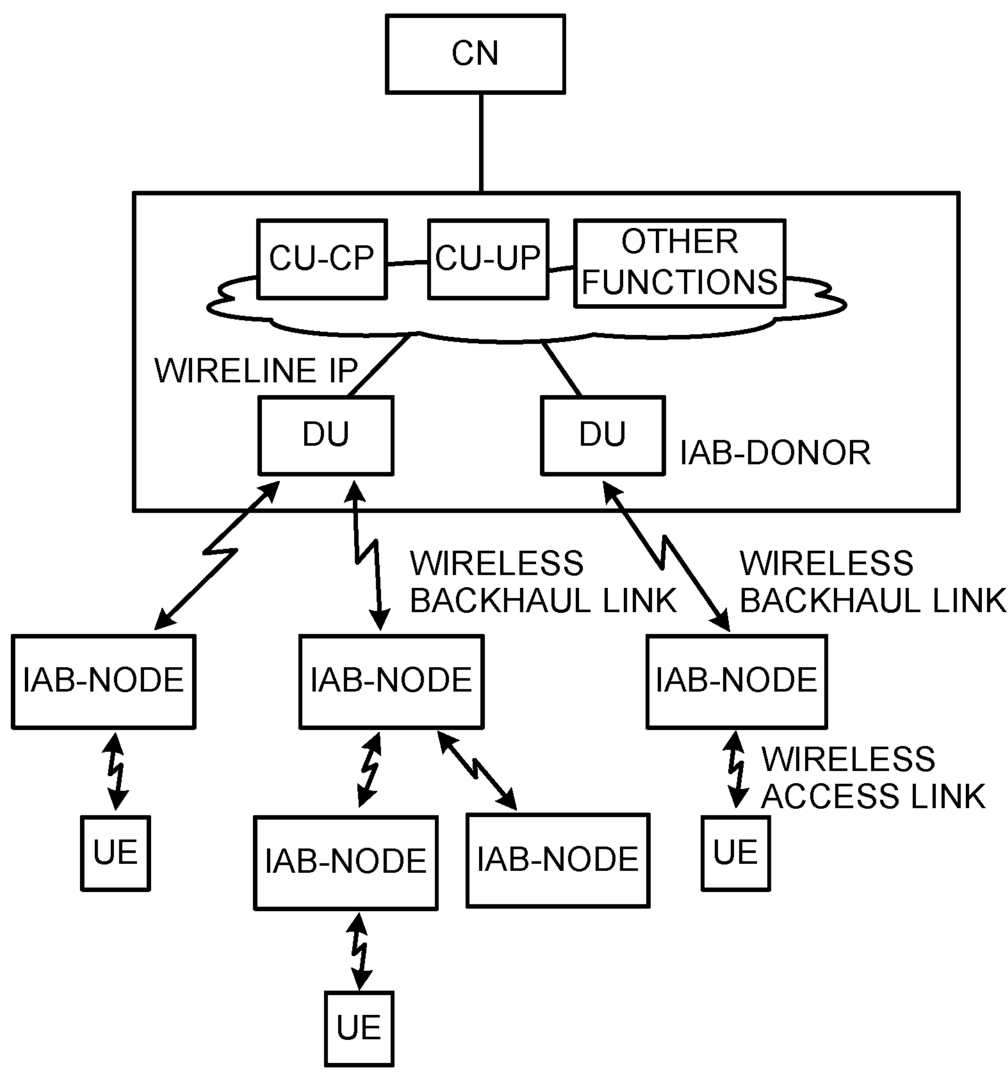
FIG. 1 is a block diagram illustration of a reference diagram for IAB architecture according to some embodiments.
Figure 2:
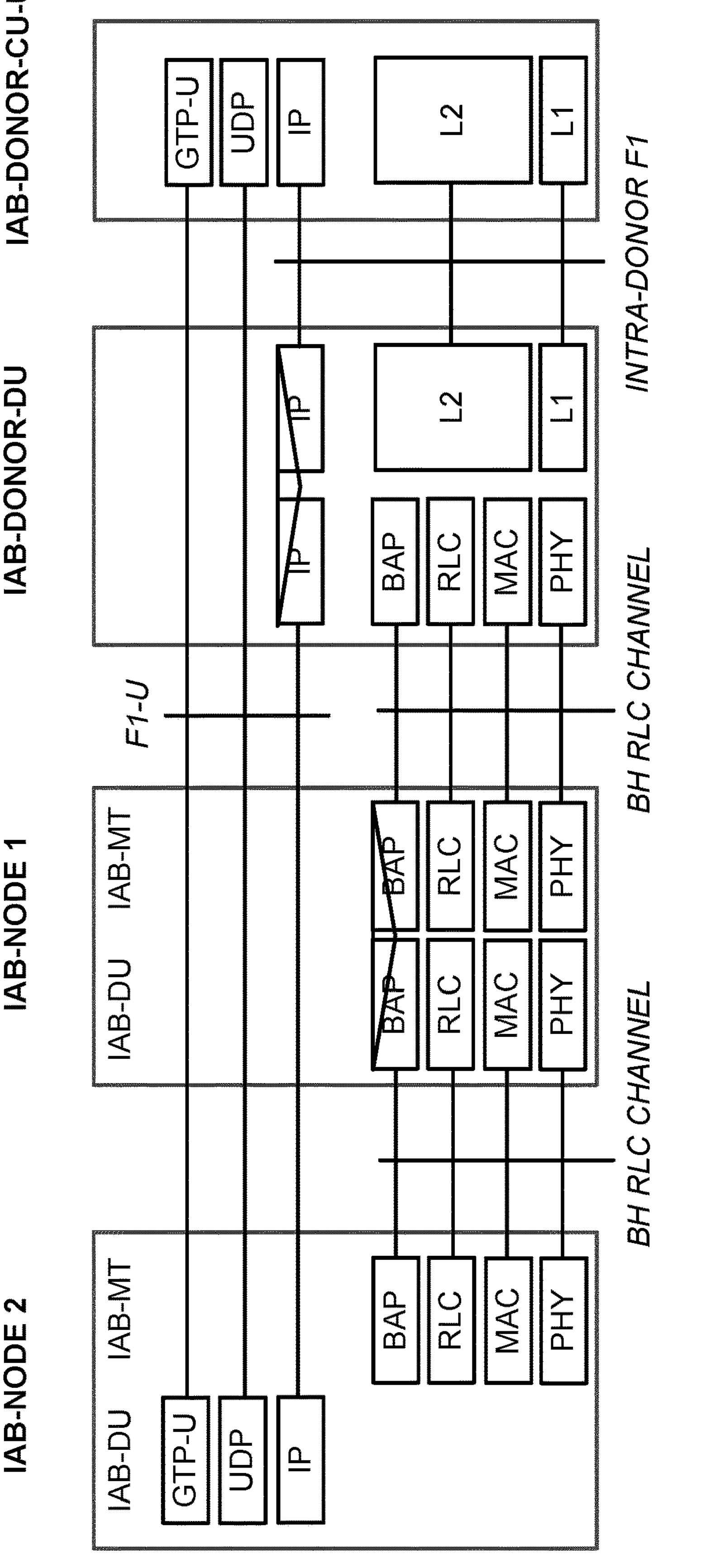
FIG. 2 is a block diagram illustration of a baseline user plane (UP) protocol stack for IAB in rel-16 according to some embodiments.
Figure 3:
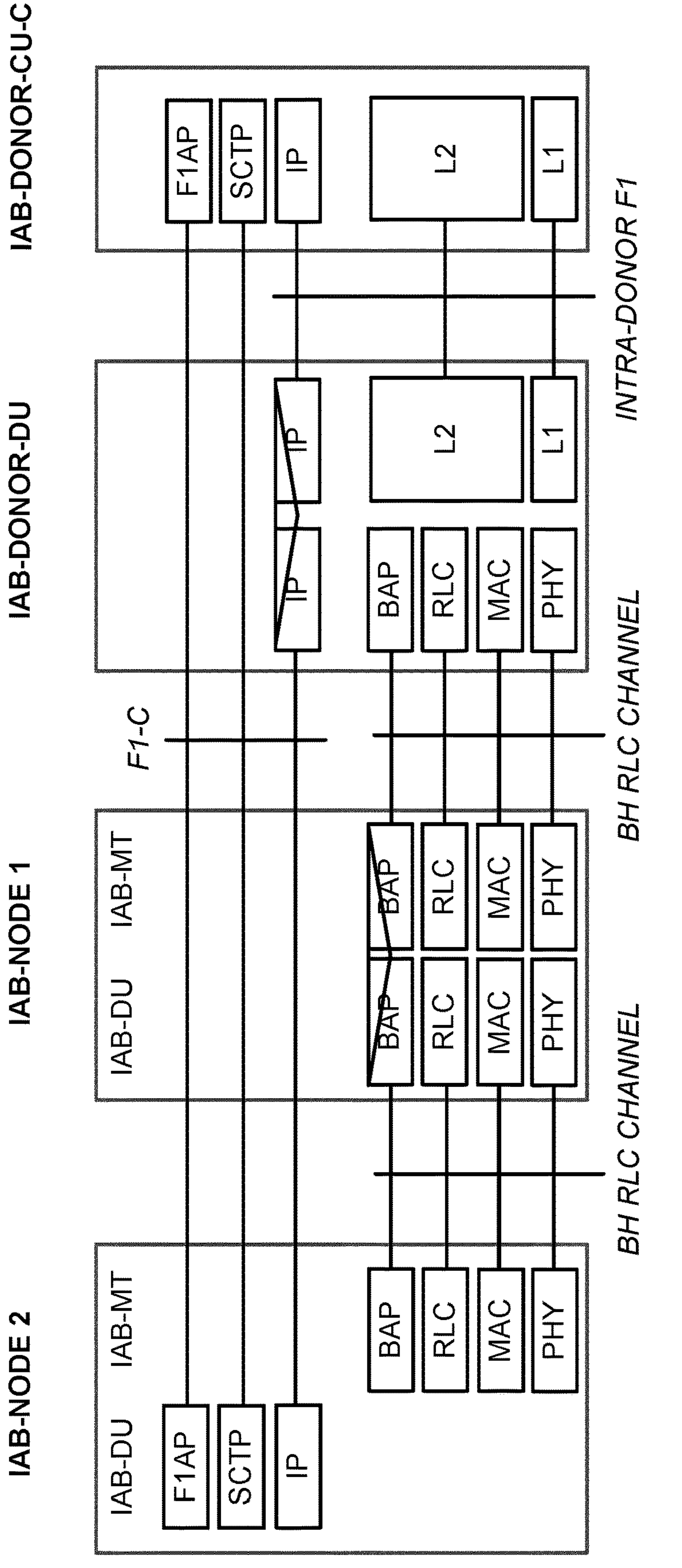
FIG. 3 is a baseline control plane (CP) protocol stack for IAB in rel-16 according to some embodiments.
Figure 4:
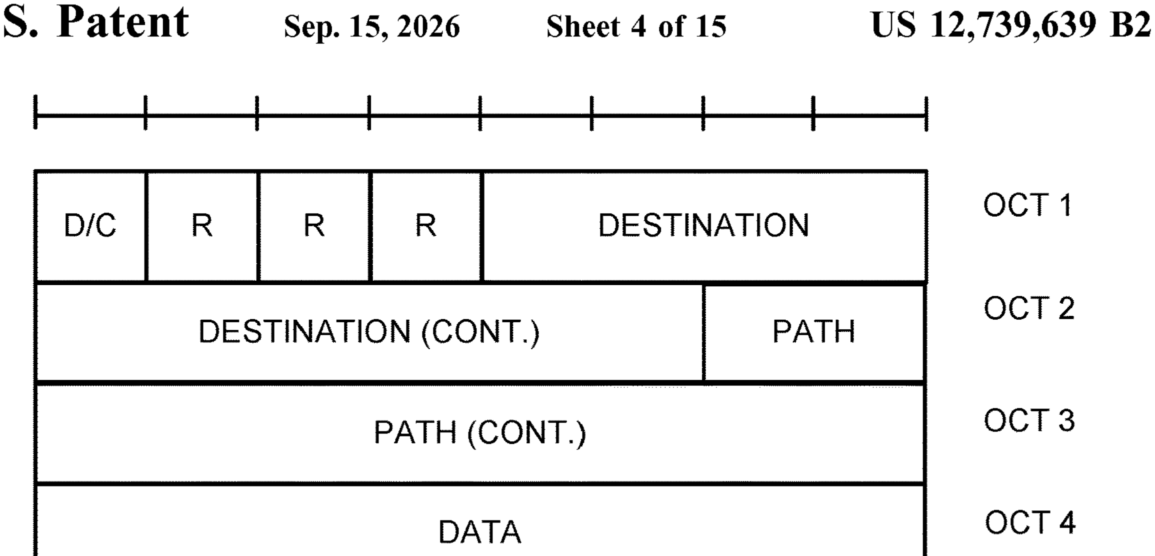
FIG. 4 is an illustration of a BAP Data PDU format according to some embodiments.
Figure 5:
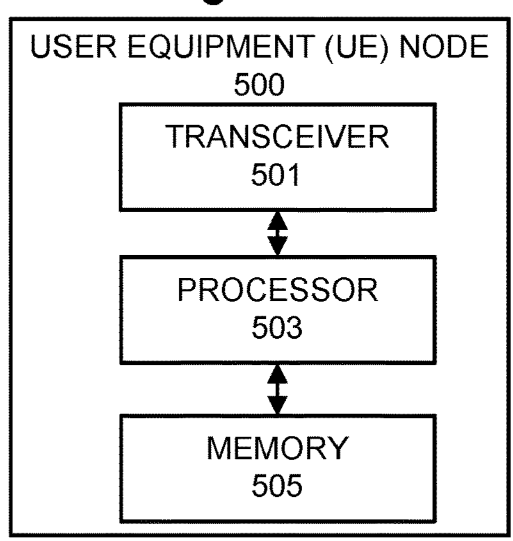
FIG. 5 is a block diagram illustrating a wireless device UE according to some embodiments of inventive concepts.

FIG. 5 depicts an example of a UE 500 (also referred to as a mobile terminal, a mobile communication terminal, a wireless device, a wireless communication device, a wireless terminal, mobile device, a wireless communication terminal, user equipment, UE, a user equipment node/terminal/device, etc.) of a wireless communication network configured to provide wireless communication according to embodiments of inventive concepts. UE 500 may be provided, for example, as discussed below with respect to wireless devices UE 1712A, UE 1712B, and wired or wireless devices UE 1712C, UE 1712D of FIG. 17, UE 1800 of FIG. 18, virtualization hardware 2104 and virtual machines 2108A, 2108B of FIG. 21, and UE 2206 of FIG. 22, all of which should be considered interchangeable in the examples and embodiments described herein and be within the intended scope of this disclosure, unless otherwise noted.) As shown, the UE 500 may include an antenna 507 (e.g., corresponding to antenna 1822 of FIG. 18), and transceiver circuitry 501 (also referred to as a transceiver, e.g., corresponding to interface 1812 of FIG. 18 having transmitter 1818 and receiver 1820) including a transmitter and a receiver configured to provide uplink and downlink radio communications with a base station(s) (e.g., corresponding to network node 1710A, 1710B of FIG. 17, network node 1900 of FIG. 19, and network node 2204 of FIG. 22 also referred to as a RAN node) of a radio access network. The UE 500 may also include processing circuitry 503 (also referred to as a processor, e.g., corresponding to processing circuitry 1802 of FIG. 18, and control system 2112 of FIG. 21) coupled to the transceiver circuit 501, and a memory circuit 505 (also referred to as memory, e.g., corresponding to memory 1810 of FIG. 17) coupled to the processor circuitry 503. The memory circuitry 505 may include computer readable program code that when executed by the processing circuitry 503 causes the processing circuit to perform operations according to embodiments disclosed herein. According to other embodiments, processing circuitry 503 may be defined to include memory so that a separate memory circuit is not required.

As discussed herein, operations of the UE 500 may be performed by processing circuitry 503 and/or transceiver 501. For example, the processing circuitry 503 may control transceiver 501 to transmit uplink communications through transceiver 501 over a radio interface to one or more network nodes and/or to receive downlink communications through transceiver 501 from one or more network nodes over a radio interface. Moreover, modules may be stored in memory 505, and these modules may provide instructions so that when instructions of a module are executed by processing circuitry 503, the processing circuitry 503 performs respective operations (e.g., operations discussed herein with respect to example embodiments).

Accordingly, a UE 500 according to some embodiments includes processing circuitry 503, transceiver circuitry 501 coupled to the processing circuitry 503, and memory circuitry 505 coupled to the processor circuit, the memory including machine readable program instructions that, when executed by the processor circuit, cause the UE to perform operations.

FIG. 5 depicts an example of an IAB node 600 (also referred to as a base station, eNB, eNodeB, gNB, gNodeB, etc.) of a communication network configured to provide communication according to embodiments of inventive concepts. The IAB node 600 may correspond to a distributed unit, a radio unit or a combination of a distributed unit and a radio unit in a RAN node, and may be provided, for example, as discussed below with respect to network node 1710A, 1710B of FIG. 17, network node 1900 of FIG. 19, hardware 2104 or virtual machine 2108A, 2108B of FIG. 21, and/or base station 2204 of FIG. 22, all of which should be considered interchangeable in the examples and embodiments described herein and be within the intended scope of this disclosure, unless otherwise noted. As shown, IAB node 600 may include transceiver circuitry 601 (also referred to as a transceiver, e.g., corresponding to portions of RF transceiver circuitry 1912 and radio front end circuitry 1918 of FIG. 19) including a transmitter and a receiver configured to provide uplink and downlink radio communications with wireless devices. The IAB node 600 may include network interface circuitry 607 (also referred to as a network interface, e.g., corresponding to portions of communication interface 1906 of FIG. 19) configured to provide communications with other nodes (e.g., with other IAB nodes, base stations and/or core network nodes) of the wireless communication network. The IAB node 1200 may also include processing circuitry 603 (also referred to as a processor, e.g., corresponding to processing circuitry 1902 of FIG. 19) coupled to the transceiver circuit 601, and memory circuitry 605 (also referred to as memory, e.g., corresponding to memory 1904 of FIG. 19) coupled to the processing circuitry 603. The memory circuitry 605 may include computer readable program code that when executed by the processing circuitry 603 causes the processor circuit to perform operations according to embodiments disclosed herein. According to other embodiments, processing circuitry 603 may be defined to include memory so that a separate memory circuit is not required.

As discussed herein, operations of the IAB node 600 may be performed by processing circuitry 603, network interface circuitry 607, and/or transceiver 601. For example, processing circuitry 603 may control transceiver circuitry 601 to transmit downlink communications through transceiver circuitry 601 over a radio interface to one or more UEs and/or to receive uplink communications through transceiver circuitry 601 from one or more UEs over a radio interface. Similarly, processing circuitry 603 may control network interface circuitry 607 to transmit communications through network interface circuitry 607 to one or more other IAB nodes and/or to receive communications through network interface from one or more other IAB nodes. Moreover, modules may be stored in memory 605, and these modules may provide instructions so that when instructions of a module are executed by processing circuitry 603, processing circuitry 603 performs respective operations (e.g., operations discussed below with respect to example embodiments). Moreover, IAB nodes discussed herein may be implemented as virtual IAB nodes.

Accordingly, an IAB node 600 according to some embodiments includes processing circuitry 603, transceiver circuitry 601 coupled to the processing circuitry, and memory circuitry 605 coupled to the processing circuitry, the memory including machine readable program instructions that, when executed by the processing circuitry, cause the IAB node 600 to perform operations described below.

FIG. 7 depicts an example of a central unit (CU) IAB node 700 (also referred to as a base station, eNB, eNodeB, gNB, gNodeB, etc.) of a communication network configured to provide communication according to embodiments of inventive concepts relating to CU IAB nodes. The CU IAB node 700 may correspond to a central unit, a radio unit or a combination of a central unit and a radio unit in a RAN node and may be provided, for example, as discussed below with respect to network node 1710A, 1710B of FIG. 17, network node 1900 of FIG. 19, hardware 2104 or virtual machine 2108A, 2108B of FIG. 21, and/or base station 2204 of FIG. 22, all of which should be considered interchangeable in the examples and embodiments described herein and be within the intended scope of this disclosure, unless otherwise noted. As shown, CU IAB node 700 may include transceiver circuitry 701 (also referred to as a transceiver, e.g., corresponding to portions of RF transceiver circuitry 1912 and radio front end circuitry 1918 of FIG. 19) including a transmitter and a receiver configured to provide uplink and downlink radio communications with wireless devices. The CU IAB node 700 may include network interface circuitry 707 (also referred to as a network interface, e.g., corresponding to portions of communication interface 1906 of FIG. 19) configured to provide communications with other nodes (e.g., with other IAB nodes, CU IAB nodes, base stations and/or core network nodes) of the wireless communication network. The CU IAB node 700 may also include processing circuitry 703 (also referred to as a processor, e.g., corresponding to processing circuitry 1902 of FIG. 19) coupled to the transceiver circuit 701, and memory circuitry 705 (also referred to as memory, e.g., corresponding to memory 1904 of FIG. 19) coupled to the processing circuitry 703. The memory circuitry 705 may include computer readable program code that when executed by the processing circuitry 703 causes the processor circuit to perform operations according to embodiments disclosed herein. According to other embodiments, processing circuitry 703 may be defined to include memory so that a separate memory circuit is not required.

As discussed herein, operations of the CU IAB node 700 may be performed by processing circuitry 703, network interface circuitry 707, and/or transceiver 701. For example, processing circuitry 703 may control transceiver circuitry 701 to transmit downlink communications through transceiver circuitry 701 over a radio interface to one or more UEs and/or to receive uplink communications through transceiver circuitry 701 from one or more UEs over a radio interface. Similarly, processing circuitry 703 may control network interface circuitry 707 to transmit communications through network interface circuitry 707 to one or more other IAB nodes and/or to receive communications through network interface from one or more other IAB nodes. Moreover, modules may be stored in memory 705, and these modules may provide instructions so that when instructions of a module are executed by processing circuitry 703, processing circuitry 703 performs respective operations (e.g., operations discussed below with respect to example embodiments). Moreover, IAB nodes discussed herein may be implemented as virtual IAB nodes.

Accordingly, a CU IAB node 700 according to some embodiments includes processing circuitry 703, transceiver circuitry 701 coupled to the processing circuitry, and memory circuitry 705 coupled to the processing circuitry, the memory including machine readable program instructions that, when executed by the processing circuitry, cause the CU IAB node 700 to perform operations described below.

As previously indicated, in legacy operations, the integrity protection function is just designed for the Uu link and it has been recently extended also the PC5 link for sidelink communications. No security mechanism is currently available in 3GPP standards for the BH link.

The integrity protection functions (i.e., integrity protection and integrity verification) in the legacy operations is performed in the PDCP layer, if configured. The data unit that is integrity protected is the PDU header and the data part of the PDU before ciphering. The integrity protection is always applied to PDCP Data PDUs of SRBs. The integrity protection is also applied to PDCP Data PDUs of DRBs for which integrity protection is configured.

For downlink and uplink, the integrity protection algorithm and key to be used by the PDCP entity are configured by the RRC (radio resource control) as specified in TS 38.331 V16.5.0 and the integrity protection method shall be applied as specified in TS 33.501 V16.7.1. In particular, the parameters that PDCP requires to apply the integrity protection function include the following among others:

BEARER (defined as the radio bearer identifier in TS 33.501 V16.7.1. It will use the value RB identity—1 as in TS 38.331 V16.5.0);

KEY (the integrity protection keys for the control plane and for the user plane are $K_{RRCint}$ and $K_{UPint}$, respectively) provided via RRC layer as per TS 38.331 V16.5.0 signalling.

Once the above security parameters are configured, a special field is included by the transmitter in the PDCP packet header, in order to allow the receiver of such packet to execute the integrity protection function. The PDCP packet header for the data PDU of a DRB is illustrated in FIG. 8. The MAC-I (Message Authentication Code-Integrity) is also present in the data PDU of SRBs.

At transmission, the UE computes the value of the MAC-I field and at reception it verifies the integrity of the PDCP Data PDU by calculating the X-MAC, i.e. the MAC-I that the UE computes on the basis of the received configuration of security parameters as explained above. If the calculated X-MAC corresponds to the received MAC-I, integrity protection is verified successfully.

System/Structure/Node Level Architecture/Platforms—Detailed Description and Figure(s)

The term "IAB access node" for a UE is used to identify the IAB node that offers the Uu connection to such a UE. For downstream traffic, the IAB access node can be the IAB destination for a certain BAP PDU.

The term "intermediate IAB node" is used to identify the IAB node that relays BAP PDUs in the path towards the IAB donor DU (for upstream) and towards the IAB access node (for downstream).

The term "attacking IAB node" is used to identify the IAB node that performs an attack.

Security Configuration and Procedures

In a first embodiment, an IAB node is configured by the CU IAB node (or core network node like AMF or parent IAB node or donor IAB node or some other entity) to perform the BH integrity protection and verification for BAP Data PDU packets transmitted/received over the backhaul link. The BH integrity protection configuration is configured separately from other possible integrity protection configurations to be used over other RAN links. For example, an IAB node may be configured with a BH integrity protection configuration to be adopted for packet transmission/reception over the BH link (i.e., when transmitting/receiving to/from another IAB node), and with a separate integrity protection configuration to be adopted over the Uu link when transmitting/receiving packets to/from UEs.

The parameters configured by the CU IAB node (or core network node like AMF or parent IAB node or donor IAB node or some other entity) and to be adopted by the BH integrity protection function for the Data PDU may include at least one of the following parameters:

The ID of the BH RLC channel ID associated to the BAP PDU to be protected

The security keys (root key and/or derived keys for integrity protection)

The BAP PDU or some derivation of it (e.g., the PDU with some fields set to constant values)

D/C, R, T fields of the BH header

Refresh token (e.g., nonce, sequence number or counter that provides replay protection)

The IAB node destination identity of the BAP PDU to be protected

The path identity over which the BAP PDU to be protected is transmitted

The security algorithm identity (e.g., EIA or NIA for integrity protection)

It is noted that the above parameters or some variation of it is equally applicable to the case of encryption in addition to integrity protection.

On the basis of the above parameters, a transmitting IAB node may compute the security token to be included in the BAP header of the transmitted BAP Data PDU, and a receiving IAB node may perform the integrity protection verification of the received BAP Data PDU. The above list of parameters implies that different integrity protection algorithms may be performed for a BAP Data PDU depending on the associated BH RLC channel, on the destination of the BAP PDU, on the path over which it shall be transmitted, etc.

The above parameters may be conveyed by the CU IAB node (or core network node like AMF or parent IAB node or donor IAB node or some other entity) to the IAB node via RRC signalling or via F1-C signalling or any other similar interfaces. For example, the MT part of the IAB node may be configured via RRC with the above parameters to perform integrity protection of upstream transmissions and integrity verification of downstream transmissions. On the other hand, the DU part of the IAB node may be configured via F1-C signalling with the above set of parameters to perform integrity protection of downstream transmissions and integrity protection of upstream transmissions.

In one embodiment of inventive concepts, each IAB node in the network is configured to perform BH integrity protection and verification for transmission/reception of BAP Data PDU packets. Hence, in this embodiment, the BH integrity protection configurations at one transmitting IAB node and at the corresponding receiving IAB node is such that the two transmitting and receiving IAB nodes can successfully perform the BH integrity protection (at the transmitting IAB node) and verification (at the receiving IAB node).

Figure 9:
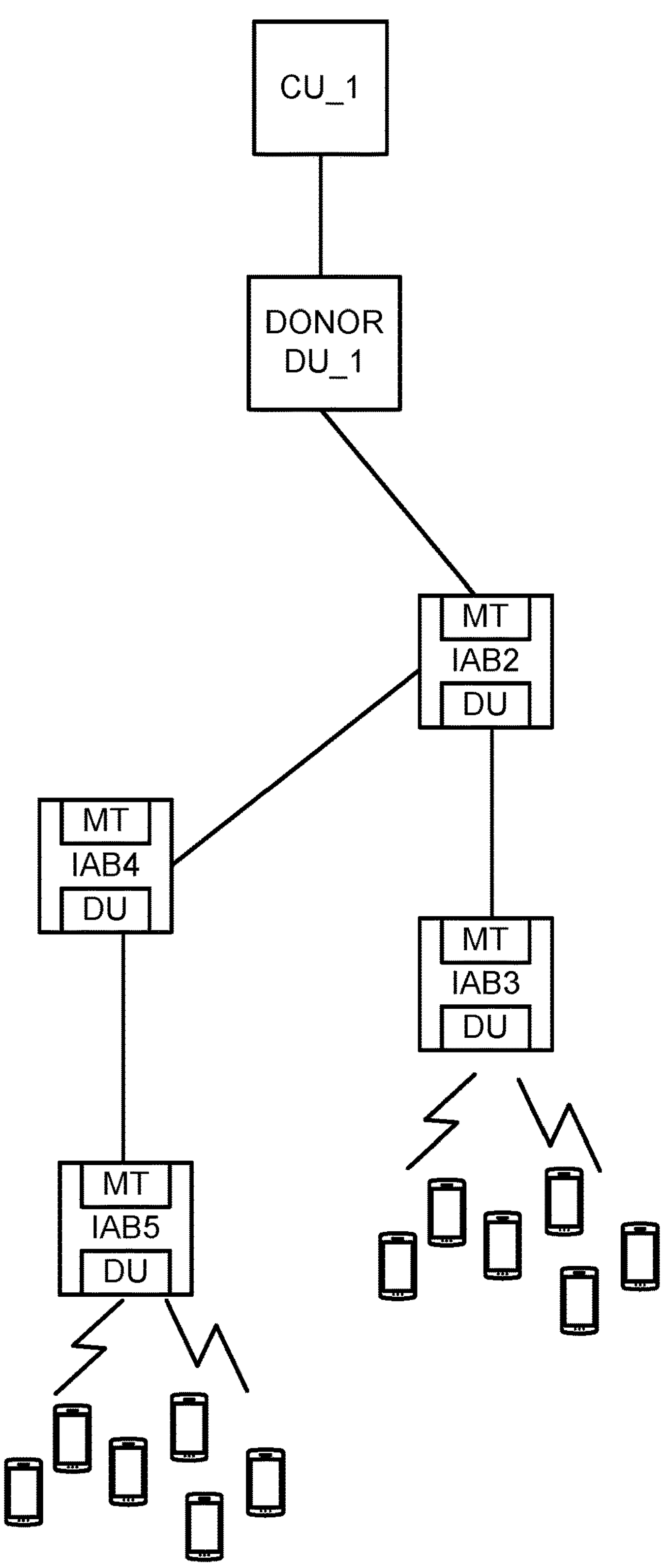
FIG. 9 is an illustration of an example of IAB topology according to some embodiments.

In another embodiment, the BH integrity protection is only configured and performed at the IAB donor node (for downstream traffic) and at the IAB access node (for the upstream traffic). This implies that the token to be included in a BAP header is only computed once, i.e., either by the IAB donor node (for downstream traffic) and by the IAB access node (for the upstream traffic). On the other hand, each receiving IAB node is configured to perform integrity protection verification of received packets in order to verify whether the IAB node of the previous hop performed an attack or not. Hence, in this embodiment, the intermediate IAB nodes, i.e., the IAB nodes different from the IAB donor DU and from the IAB access node, shall just relay the token included in the received BAP PDU as it is without modifying it. Taking FIG. 9 as an example for this embodiment, the donor DU_1 performs the integrity protections for packets destined to the IAB access nodes, i.e., IAB5/3, whereas the IAB access nodes IAB5/3 performs the integrity protections for packets destined to the donor DU_1. The intermediate IAB nodes, IAB3/5, as well as the IAB donor and IAB access nodes perform the integrity protection verification of received packets. There may be more than one security tokens calculated with different security keys so that intermediate IAB nodes verify the token meant for them with the keys that were provided to them for this purpose.

In a further embodiment of inventive concepts, the token is only included for transmissions on paths where there is at least one intermediate node on the path. For example, if a first node should send something do a second node it would include the token only if there is a third node on the path between the first and second node, but not include a token if there is a direct path between the first and second node. Whether there is a direct path or a path with intermediate nodes may be determined by the transmitting node itself, or it may be determined by another node which configures the transmitting node as per this embodiment.

Additionally, security protection verification may be only configured to a receiving IAB node, if the transmitting IAB node of the previous hop is configured to perform security protection for packets transmitted in the BH link to this receiving IAB node, and possibly associated to a certain BH RLC channel ID and with certain destinations and path identities. Otherwise, security protection verification is not executed by the receiving IAB node for such packets.

Transmitter Procedure

In a further embodiment of inventive concepts, a transmitting node in an IAB-scenario (or other scenario where the BAP-protocol is used) may generate a BAP Data PDU which includes a security token. As disclosed in previous embodiments, such action may be performed (depending on the configured parameters) by any IAB node or just by the IAB donor DU (for the case of the downstream traffic), or just by the IAB access node (for the case of the upstream traffic). The security token may be placed in the header of a BAP Data PDU.

The transmitter may set a field to a first value (e.g., 1) indicating presence of the token, and to another value (e.g., 0) to indicate absence of the token.

Figure 6:
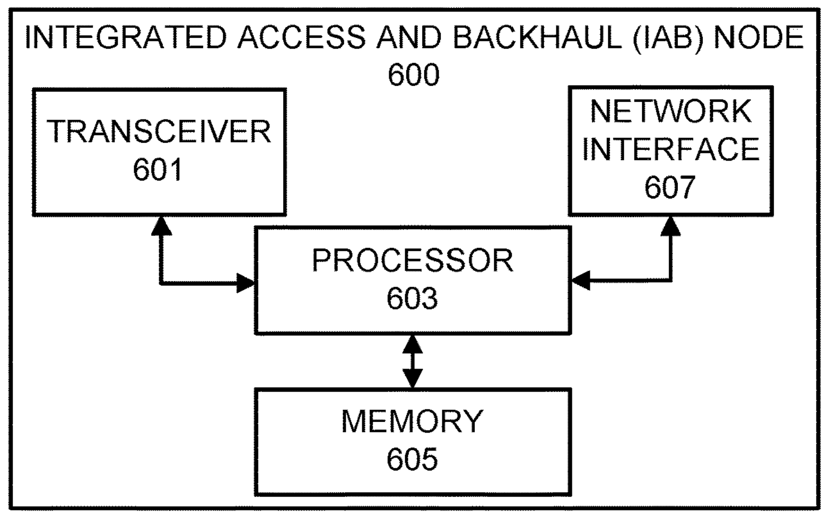
FIG. 6 is a block diagram illustrating an integrated access and backhaul (IAB) node according to some embodiments of inventive concepts.

In the description that follows, while the communication device may be any of the communication device 700, wireless device 1712A, 1712B, wired or wireless devices UE 1712C, UE 1712D, UE 1800, virtualization hardware 2104, virtual machines 2108A, 2108B, or UE 2206, the communication device 300 shall be used to describe the functionality of the operations of the communication device. Operations of the communication device 300 (implemented using the structure of the block diagram of FIG. 6) will now be discussed with reference to the flow chart of FIG. 12 according to some embodiments of inventive concepts. For example, modules may be stored in memory 305 of FIG. 6, and these modules may provide instructions so that when the instructions of a module are executed by respective communication device processing circuitry 303, processing circuitry 303 performs respective operations of the flow chart.

If the IAB node is configured to perform integrity protection, it generates a token, e.g., a MAC-I token based on certain parameters associated to the BAP Data PDU to be protected as disclosed in previous embodiments, e.g., the BH RLC channel, the destination, the path of the said BAP PDU. The token generation can use some key derivation function like HMAC-SHA-256 or integrity protection algorithm like based on SNOW 3G, AES-CMAC or ZUC. One example of token called MAC-I generation is shown below:

The MAC-I could be a 128-bit (or truncated 16-bit or 32-bit) message authentication token, calculated using an integrity algorithm (NIA or EIA) and a pre-configured integrity key in the IAB nodes, with the following inputs:

- KEY: set to pre-configured integrity key
- BEARER: all its bits set to 1. Or an unique input for the BEARER (i.e., ID of the BH RLC channel ID associated to the BAP PDU to be protected)
- DIRECTION: all its bit set to 1; Or 0/1 for different directions
- COUNT: all its bits set to Sequence number included in the BAP Data PDU;
- MESSAGE: set to at least the following inputs: PATH, DESTINATION Otherwise, if the IAB node is not configured to perform integrity protection, and it has to relay to the next hop a BAP Data PDU which already included the token, the IAB node copies and stores the token included in the corresponding received BAP Data PDU and appends it to the BAP PDU to be transmitted to the next hop.

Receiver Procedures

Below it will be described methods applied by a receiving node of a BAP PDU. As disclosed in previous embodiments, the "receiving node" may be the node that is the destination of a PDU, i.e. the IAB donor DU (for upstream traffic) or the IAB access node (for downstream traffic). Or it may be a node which is on the path between the source and the destination of the PDU, i.e., any intermediate IAB node.

The receiving node will determine whether the BAP Data PDU is valid or not. This may be determined based on the token included by the transmitter in the BAP PDU, e.g., MAC-I, and the token, e.g. X-MAC, computed by the receiver on the basis of the received configuration of security parameters and in same way as the transmitter. If the token computed by the receiver matches the token included in the received BAP Data PDU, the BAP Data PDU is declared as valid otherwise as not valid.

If the BAP PDU is not valid, the receiving node will take one or more actions, for example:

- Discard the BAP PDU
- Indicate to the CU IAB node that a BAP Data PDU has been declared as not valid, indicating that the cause is unsuccessful security protection verification. This message may also include the identity of the IAB node of the previous hop that transmitted the concerned invalid BAP Data PDU, i.e., the attacking IAB node. The message may also include the destination identity and the path identity included in the BAP header of the concerned BAP PDU. This message may be transmitted via RRC or via F1-C signalling. The RRC signalling may be used in case the integrity protection verification is performed at the MT of the IAB node (e.g., in case of downstream traffic). The F1-C signalling may be used in case the integrity protection verification is performed at the DU of the IAB node (e.g., in case of upstream traffic). In another example, in case the integrity protection verification is performed at the MT and the received BAP PDU is invalid, the MT informs the DU part of the IAB node which in turn will signal the unsuccessful verification to the CU IAB node via F1-C.
- Performs an RRC connection reestablishment to an IAB node different from the one from which the invalid BAP Data PDU was received
- Keep log, inform higher layers, or provide notification to another entity In case the CU IAB node is informed by an IAB node of a received invalid BAP PDU, the CU IAB node may perform certain actions, such as:

- Release the RRC connection between the concerned IAB node and the attacking IAB node. For example, the CU IAB node may initiate an handover to migrate the BH connection of the concerned IAB node to another IAB node.
- Update the routing tables of the concerned IAB node, and possibly the routing tables of other IAB nodes that are descendant or ancestor nodes of the attacking IAB node, such that the attacking IAB node is excluded from the IAB network topology
- Release the RRC and the F1 connection of the attacking IAB node If the BAP PDU is valid, the receiver may remove the header, including the token, and forward the content of the PDU (also known as the SDU or as Data) to the higher layers and then to the transmitting entity if the BAP Data PDU has to be relayed to the next hop. Methods disclosed in the transmitter procedure above for the transmitting entity apply.

In some embodiments, the receiving node may determine whether a field in the PDU indicates whether a token is included or not. In various of these embodiments, the receiving node may only apply the methods described above for PDUs which have a token.

Example Implementation in BAP Specification

Figure 10:
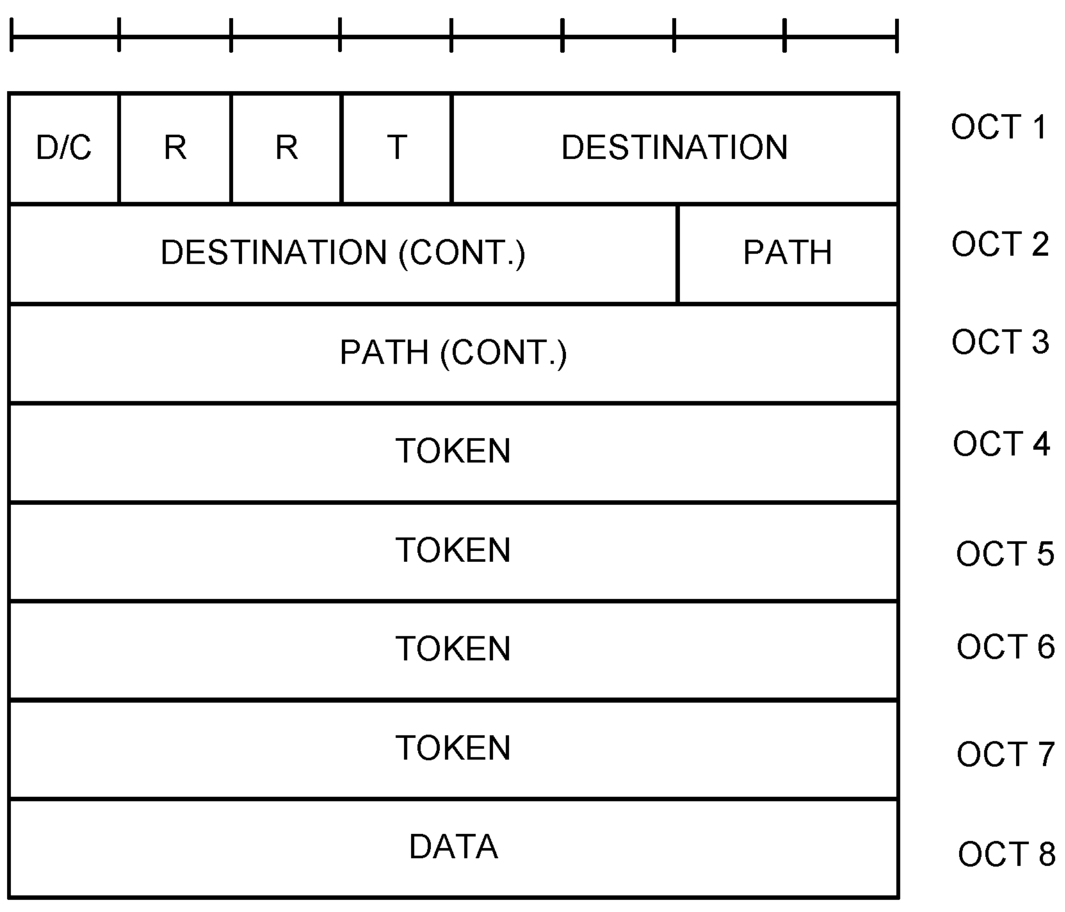
FIG. 10 is an illustration of a BAP Data PDU extension with one or more Token fields according to some embodiments of inventive concepts.

An example illustrating some embodiments of the inventive concepts described above is illustrated in FIG. 10. The design of a BAP Data PDU is shown in FIG. 10, wherein a Token-field (in this case 4 octets) is placed after the PATH-field. Sequence number could also be added to provide protection against replay.

Also, a T-field can be used which can indicate presence/absence of the Token-field.

Figure 11:
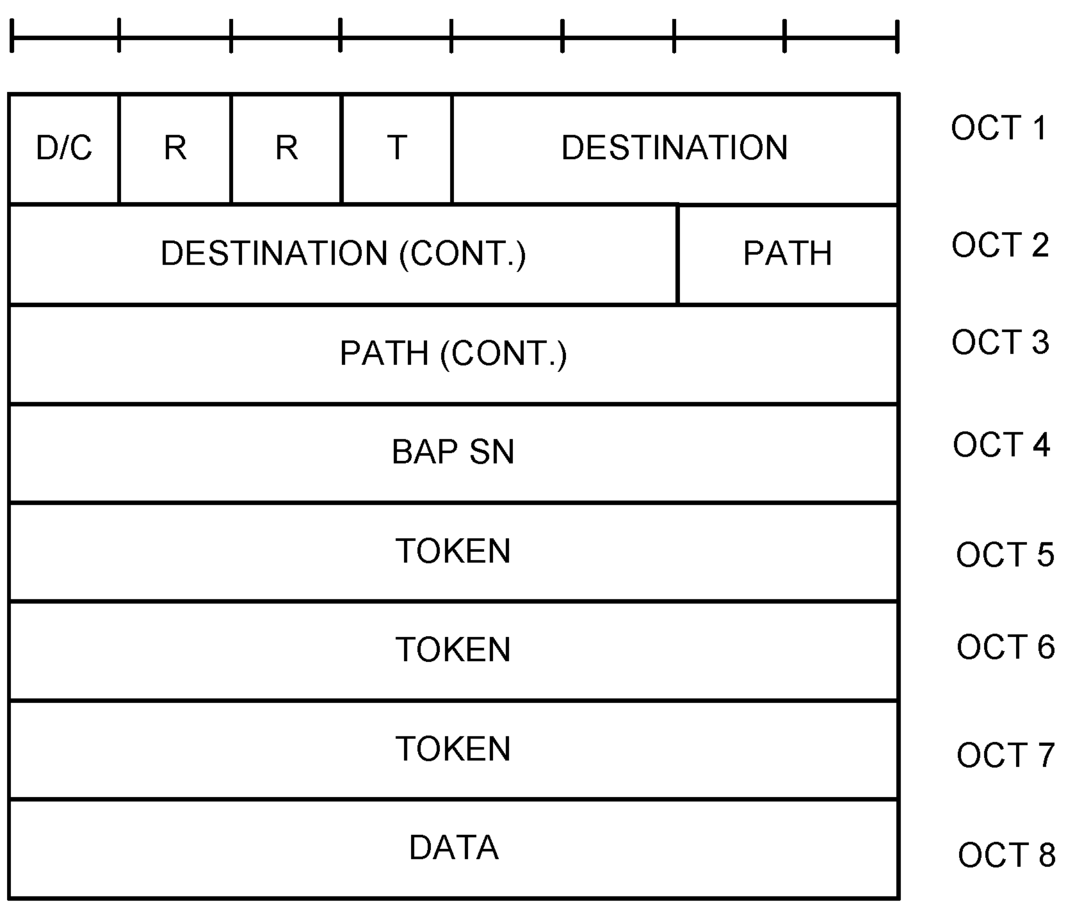
FIG. 11 is an illustration of a BAP Data PDU extension with one or more Token fields and a BAP SN according to some embodiments of inventive concepts

FIG. 11 illustrates a BAP PDU including the BAP SN to support reply protection. As an example, the BAP SN occupies one octet of the BAP PDU in the example shown.

In the description that follows, while the node may be any of the IAB node 600, network node 1710A, 1710B, 1900, 2206, hardware 2104, or virtual machine 2108A, 2108B, the IAB node 600 shall be used to describe the functionality of the operations of the IAB node. Operations of the IAB node 600 (implemented using the structure of FIG. 6) will now be discussed with reference to the flow chart of FIG. 12 according to some embodiments of inventive concepts. For example, modules may be stored in memory 605 of FIG. 6, and these modules may provide instructions so that when the instructions of a module are executed by respective IAB node processing circuitry 603, processing circuitry 603 performs respective operations of the flow chart.

Figure 12:
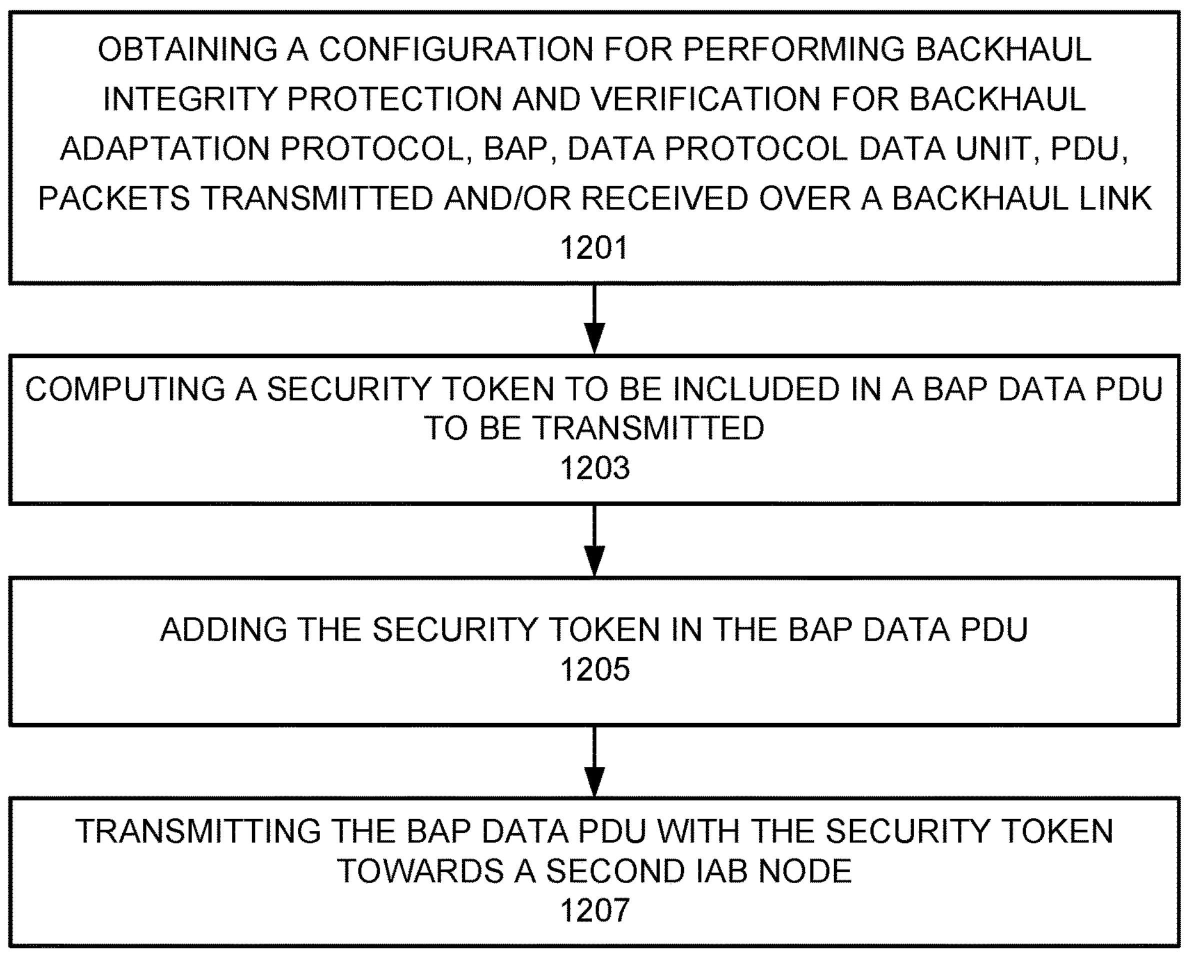

FIG. 12 is a flowchart illustrating operations a node such as an IAB node 600 performs. Turning to FIG. 12, in block 1201, the processing circuitry 603 obtains a configuration for performing backhaul integrity protection and verification for backhaul adaptation protocol, BAP, data protocol data unit, PDU, packets transmitted and/or received over a backhaul link. In some embodiments of inventive concepts, obtaining the configuration includes obtaining parameters for using in performing the backhaul integrity protection and verification.

In various embodiments, obtaining the parameters includes obtaining one or more of:

- an identification, ID, of the backhaul, BH, radio link control, RLC, channel ID associated to the BAP PDU to be protected;
- security keys comprising a root key and/or derived keys for integrity protection;
- a D/C bit indicating if the PDU is a BAP Control PDU or a BAP Data PDU, one or more reserved bits, R, and a T bit to indicate presence/absence of a token field;
- a refresh token for providing replay protection;
- an IAB node destination identity of the BAP data PDU to be protected;
- a path identity over which the BPA data PDU to be protected is transmitted; and
- a security algorithm identity of a security algorithm to use for integrity protection In some of these various embodiments, the refresh token is a sequence number (SN) to be included in the BAP data PDU.

Returning to FIG. 12, in block 1203, the processing circuitry 603 computes a security token to be included in the BAP data PDU (e.g., in a BAP header of a BAP data PDU) to be transmitted. In some embodiments, computing the security token is computed by computing the security token based on the security algorithm identity in the parameters obtained.

In block 1205, the processing circuitry 603 adds the security token in the BAP data PDU (e.g., in the BAP header of the BAP data PDU). In various embodiments, the processing circuitry 603 in adding the security token includes setting a field in the BAP header to indicate presence of the security token. In some embodiments of inventive concepts, the security token is added in the header of the BAP data PDU responsive to there being an intermediate node between the first IAB node and the second IAB node.

In block 1207, the processing circuitry 603 transmits the BAP data PDU with the security token (e.g., in the BAP header) towards a second IAB node. The second IAB node may be an intermediate IAB node or a destination IAB node.

Figure 13:
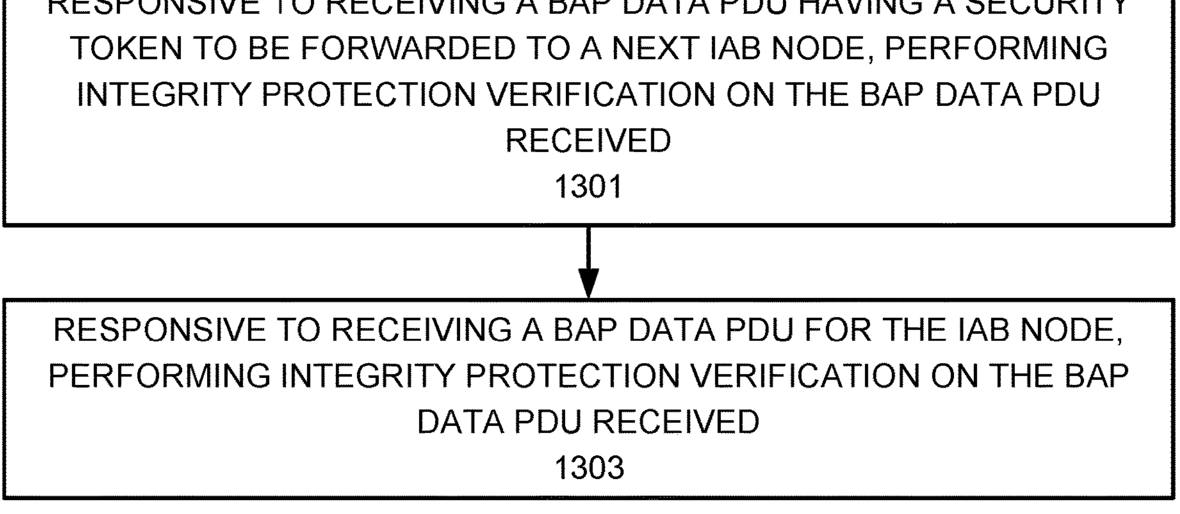

Turning to FIG. 13, the IAB node 600 receives BAP data PDUs during operation. In some embodiments of inventive concepts, the processing circuitry 603, responsive to receiving a BAP data PDU having a security token to be forwarded to a next IAB node, relays the security token included in the BAP data PDU received to the next IAB node without modifying the security token. In other embodiments of inventive concepts, the processing circuitry 603, in block 1301, responsive to receiving a BAP data PDU having a security token to be forwarded to a next IAB node, performs integrity protection verification on the BAP data PDU received. In various of these other embodiments, the BAP data PDU has multiple security tokens and in performing integrity protection verification, the processing circuitry 603 performs integrity protection verification on a security token of the multiple security tokens meant for the IAB node 600. In some of these other embodiments, the processing circuitry 603 performs integrity protection by generating a token based on parameters associated to the BAP data PDU.

In block 1303, the processing circuitry 603, responsive to receiving a BAP data PDU for the IAB node 600, performs integrity protection verification on the BAP data PDU received.

The results of performing integrity protection verification is either the BAP data PDU is not valid or is valid. FIG. 14 illustrates various embodiments of actions the IAB node 600 can perform responsive to the BAP data PDU not being valid.

Turning to FIG. 14, in block 1401, the processing circuitry 603, responsive to the integrity protection verification results in determining that the BAP data PDU is not valid, discards the BAP data PDU.

In block 1403, the processing circuitry 603, responsive to the integrity protection verification results in determining that the BAP data PDU is not valid, transmits an indication to a central unit IAB node that the BAP data PDU has been declared as not valid due to an unsuccessful security protection verification.

In block 1405, the processing circuitry 603, responsive to the integrity protection verification results in determining that the BAP data PDU is not valid, performs a Radio Resource Control, RRC, connection reestablishment. For example, the RRC connection reestablishment may be to an IAB node different from the one from which the BAP data PDU received that was determined to not be valid.

In block 1407, the processing circuitry 603, responsive to the integrity protection verification results in determining that the BAP data PDU is not valid, keeps a log of BAP data PDUs that are not valid and informing higher layers of the BAP data PDU that has been declared as not valid due to an unsuccessful security protection verification.

In other embodiments of inventive concepts, the processing circuitry 603, responsive to the integrity protection verification results in determining that the BAP data PDU is valid, removes the header, including the security token and forwards content of the BAP data PDU to higher layers and to a transmitting entity if the BAP data PDU has to be relayed to a next hop.

In the description that follows, operations the CU IAB node performs in some embodiments shall now be described. While the CU IAB node may be any of the CU IAB node 700, network node 1710A, 1710B, 1900, 2206, hardware 2104, or virtual machine 2108A, 2108B, the CU IAB node 700 shall be used to describe the functionality of the operations of the network node. Operations of the CU IAB node 700 (implemented using the structure of FIG. 7) will now be discussed with reference to the flow chart of FIG. 15 according to some embodiments of inventive concepts. For example, modules may be stored in memory 705 of FIG. 7, and these modules may provide instructions so that when the instructions of a module are executed by respective CU IAB node processing circuitry 703, processing circuitry 703 performs respective operations of the flow chart.

Turning to FIG. 15, in block 1501, the processing circuitry 703 receives an indication from an IAB node. In block 1503, the processing circuitry 703, responsive to the indication being of a received invalid BAP PDU caused by a second IAB node, performs at least one action to prevent the second IAB node from further attacks. For example, the indication could be of a received invalid BAP PDU caused by an attacking IAB node.

FIG. 16 illustrates various embodiments of the at least one action. Turning to FIG. 16, in block 1601, the processing circuitry 703 performs the at least one action by releasing a radio resource control, RRC, connection between the IAB node and the attacking IAB node. In block 1603, the processing circuitry 703 performs the at least one action by updating routing tables of IAB node such that the attacking IAB node is excluded from an IAB network topology. In block 1605, the processing circuitry 703 performs the at least one action by releasing RRC connections and F1 connections of the attacking IAB node.

Returning to FIG. 16, in block 1605, the processing circuitry 703 transmits a configuration for performing backhaul integrity protection and verification for backhaul adaptation protocol, BAP, data protocol data unit, PDU, packets transmitted and/or received over a backhaul link to the IAB node. The configuration may include parameters such as security keys including a root key and/or derived keys for integrity protection, a security algorithm identity of a security algorithm to use for integrity protection, etc.

Various operations from the flow chart of FIG. 15 may be optional with respect to some embodiments of IAB nodes and related methods. For example, operations of block 1505 of FIG. 15 may be optional in some embodiments.

Figure 17:
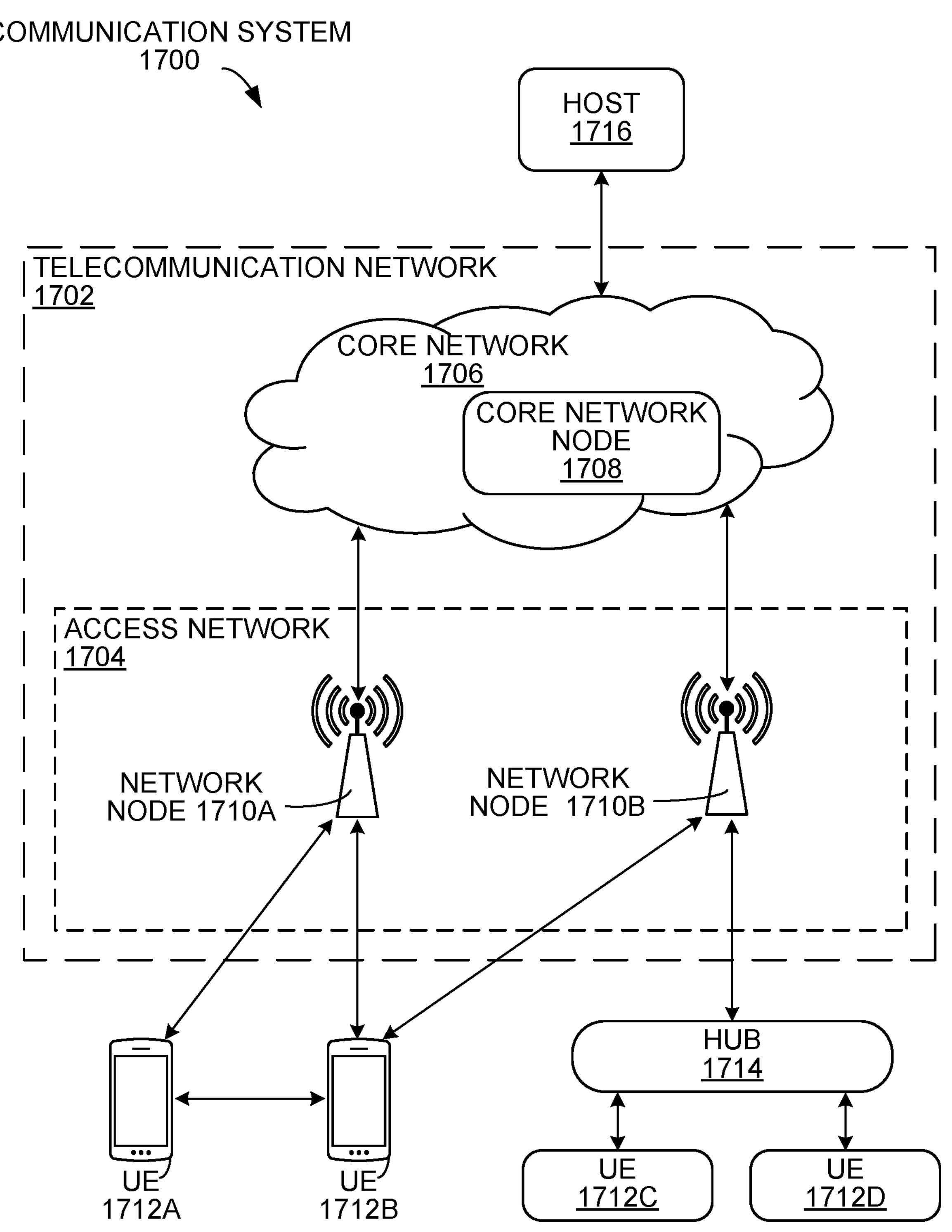
FIG. 17 is a block diagram of a communication system in accordance with some embodiments.

FIG. 17 shows an example of a communication system 1700 in accordance with some embodiments.

In the example, the communication system 1700 includes a telecommunication network 1702 that includes an access network 1704, such as a radio access network (RAN), and a core network 1706, which includes one or more core network nodes 1708. The access network 1704 includes one or more access network nodes, such as network nodes 1710*a* and 1710*b* (one or more of which may be generally referred to as network nodes 1710), or any other similar 3rd Generation Partnership Project (3GPP) access node or non-3GPP access point. The network nodes 1710 facilitate direct or indirect connection of user equipment (UE), such as by connecting UEs 1712*a*, 1712*b*, 1712*c*, and 1712*d* (one or more of which may be generally referred to as UEs 1712) to the core network 1706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1700 may include any number of wired or wireless networks, network nodes, UEs, and/or any other components or systems that may facilitate or participate in the communication of data and/or signals whether via wired or wireless connections. The communication system 1700 may include and/or interface with any type of communication, telecommunication, data, cellular, radio network, and/or other similar type of system.

The UEs 1712 may be any of a wide variety of communication devices, including wireless devices arranged, configured, and/or operable to communicate wirelessly with the network nodes 1710 and other communication devices. Similarly, the network nodes 1710 are arranged, capable, configured, and/or operable to communicate directly or indirectly with the UEs 1712 and/or with other network nodes or equipment in the telecommunication network 1702 to enable and/or provide network access, such as wireless network access, and/or to perform other functions, such as administration in the telecommunication network 1702.

In the depicted example, the core network 1706 connects the network nodes 1710 to one or more hosts, such as host 1716. These connections may be direct or indirect via one or more intermediary networks or devices. In other examples, network nodes may be directly coupled to hosts. The core network 1706 includes one more core network nodes (e.g., core network node 1708) that are structured with hardware and software components. Features of these components may be substantially similar to those described with respect to the UEs, network nodes, and/or hosts, such that the descriptions thereof are generally applicable to the corresponding components of the core network node 1708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1716 may be under the ownership or control of a service provider other than an operator or provider of the access network 1704 and/or the telecommunication network 1702, and may be operated by the service provider or on behalf of the service provider. The host 1716 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1700 of FIG. 17 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1702 is a cellular network that implements 3GPP standardized features. Accordingly, the telecommunications network 1702 may support network slicing to provide different logical networks to different devices that are connected to the telecommunication network 1702. For example, the telecommunications network 1702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1712 are configured to transmit and/or receive information without direct human interaction. For instance, a UE may be designed to transmit information to the access network 1704 on a predetermined schedule, when triggered by an internal or external event, or in response to requests from the access network 1704. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1714 communicates with the access network 1704 to facilitate indirect communication between one or more UEs (e.g., UE 1712*c* and/or 1712*d*) and network nodes (e.g., network node 1710*b*). In some examples, the hub 1714 may be a controller, router, content source and analytics, or any of the other communication devices described herein regarding UEs. For example, the hub 1714 may be a broadband router enabling access to the core network 1706 for the UEs. As another example, the hub 1714 may be a controller that sends commands or instructions to one or more actuators in the UEs. Commands or instructions may be received from the UEs, network nodes 1710, or by executable code, script, process, or other instructions in the hub 1714. As another example, the hub 1714 may be a data collector that acts as temporary storage for UE data and, in some embodiments, may perform analysis or other processing of the data. As another example, the hub 1714 may be a content source. For example, for a UE that is a VR headset, display, loudspeaker or other media delivery device, the hub 1714 may retrieve VR assets, video, audio, or other media or data related to sensory information via a network node, which the hub 1714 then provides to the UE either directly, after performing local processing, and/or after adding additional local content. In still another example, the hub 1714 acts as a proxy server or orchestrator for the UEs, in particular in if one or more of the UEs are low energy IoT devices.

The hub 1714 may have a constant/persistent or intermittent connection to the network node 1710*b*. The hub 1714 may also allow for a different communication scheme and/or schedule between the hub 1714 and UEs (e.g., UE 1712*c* and/or 1712*d*), and between the hub 1714 and the core network 1706. In other examples, the hub 1714 is connected to the core network 1706 and/or one or more UEs via a wired connection. Moreover, the hub 1714 may be configured to connect to an M2M service provider over the access network 1704 and/or to another UE over a direct connection. In some scenarios, UEs may establish a wireless connection with the network nodes 1710 while still connected via the hub 1714 via a wired or wireless connection. In some embodiments, the hub 1714 may be a dedicated hub—that is, a hub whose primary function is to route communications to/from the UEs from/to the network node 1710*b*. In other embodiments, the hub 1714 may be a non-dedicated hub—that is, a device which is capable of operating to route communications between the UEs and network node 1710*b*, but which is additionally capable of operating as a communication start and/or end point for certain data channels.

Figure 18:
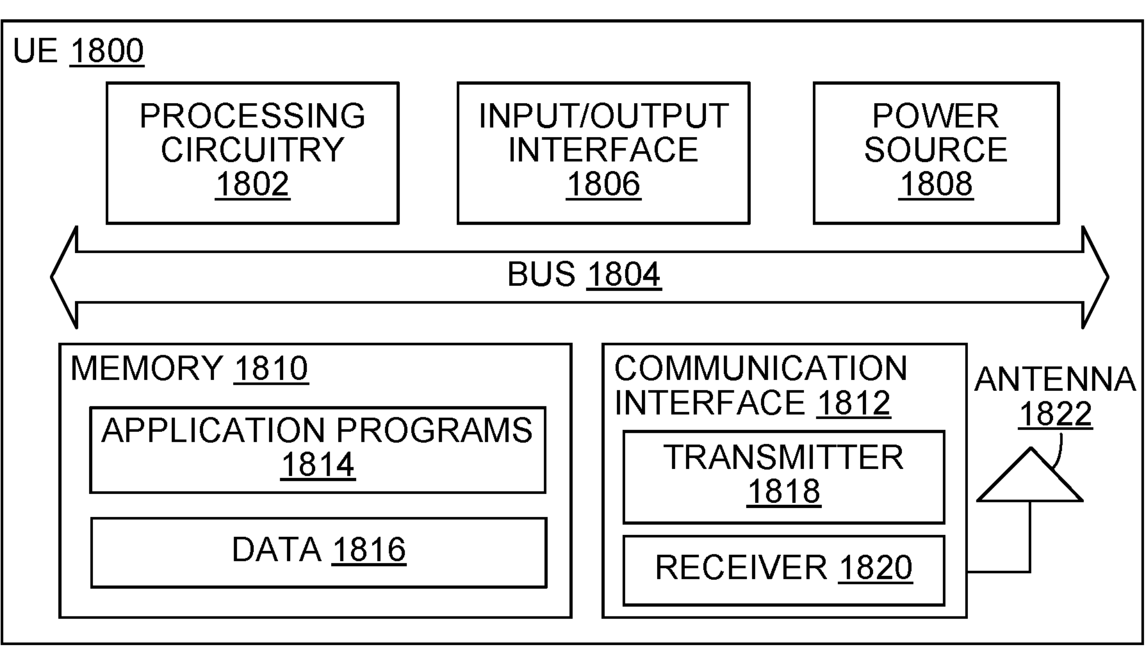
FIG. 18 is a block diagram of a user equipment in accordance with some embodiments

FIG. 18 shows a UE 1800 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1800 includes processing circuitry 1802 that is operatively coupled via a bus 1804 to an input/output interface 1806, a power source 1808, a memory 1810, a communication interface 1812, and/or any other component, or any combination thereof. Certain UEs may utilize all or a subset of the components shown in FIG. 18. The level of integration between the components may vary from one UE to another UE. Further, certain UEs may contain multiple instances of a component, such as multiple processors, memories, transceivers, transmitters, receivers, etc.

The processing circuitry 1802 is configured to process instructions and data and may be configured to implement any sequential state machine operative to execute instructions stored as machine-readable computer programs in the memory 1810. The processing circuitry 1802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1802 may include multiple central processing units (CPUs).

In the example, the input/output interface 1806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1808 is structured as a battery or battery pack. Other types of power sources, such as an external power source (e.g., an electricity outlet), photovoltaic device, or power cell, may be used. The power source 1808 may further include power circuitry for delivering power from the power source 1808 itself, and/or an external power source, to the various parts of the UE 1800 via input circuitry or an interface such as an electrical power cable. Delivering power may be, for example, for charging of the power source 1808. Power circuitry may perform any formatting, converting, or other modification to the power from the power source 1808 to make the power suitable for the respective components of the UE 1800 to which power is supplied.

The memory 1810 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1810 includes one or more application programs 1814, such as an operating system, web browser application, a widget, gadget engine, or other application, and corresponding data 1816. The memory 1810 may store, for use by the UE 1800, any of a variety of various operating systems or combinations of operating systems.

The memory 1810 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1810 may allow the UE 1800 to access instructions, application programs and the like, stored on transitory or non-transitory memory media, to off-load data, or to upload data. An article of manufacture, such as one utilizing a communication system may be tangibly embodied as or in the memory 1810, which may be or comprise a device-readable storage medium.

The processing circuitry 1802 may be configured to communicate with an access network or other network using the communication interface 1812. The communication interface 1812 may comprise one or more communication subsystems and may include or be communicatively coupled to an antenna 1822. The communication interface 1812 may include one or more transceivers used to communicate, such as by communicating with one or more remote transceivers of another device capable of wireless communication (e.g., another UE or a network node in an access network). Each transceiver may include a transmitter 1818 and/or a receiver 1820 appropriate to provide network communications (e.g., optical, electrical, frequency allocations, and so forth). Moreover, the transmitter 1818 and receiver 1820 may be coupled to one or more antennas (e.g., antenna 1822) and may share circuit components, software or firmware, or alternatively be implemented separately.

In the illustrated embodiment, communication functions of the communication interface 1812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1800 shown in FIG. 18.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 19:
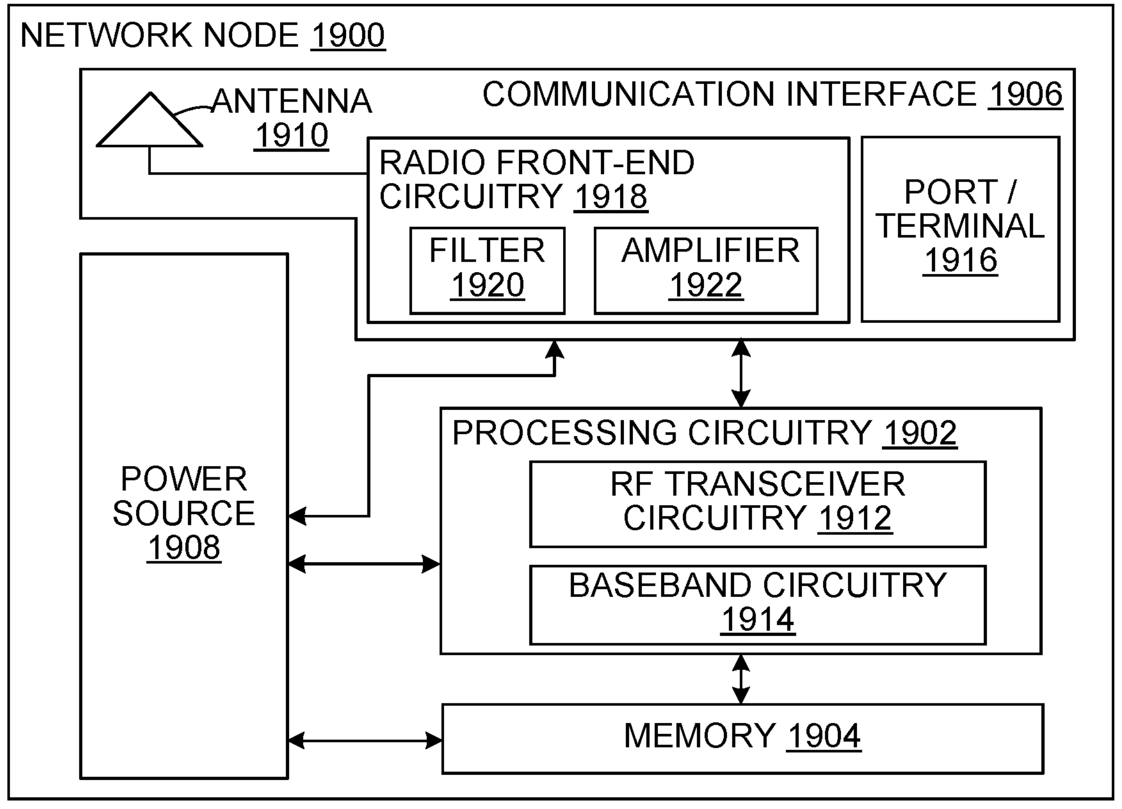
FIG. 19 is a block diagram of a network node in accordance with some embodiments.

FIG. 19 shows a network node 1900 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1900 includes a processing circuitry 1902, a memory 1904, a communication interface 1906, and a power source 1908. The network node 1900 may be composed of multiple physically separate components (e.g., a NodeB component and a RNC component, or a BTS component and a BSC component, etc.), which may each have their own respective components. In certain scenarios in which the network node 1900 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1900 may be configured to support multiple radio access technologies (RATs). In such embodiments, some components may be duplicated (e.g., separate memory 1904 for different RATs) and some components may be reused (e.g., a same antenna 1910 may be shared by different RATs). The network node 1900 may also include multiple sets of the various illustrated components for different wireless technologies integrated into network node 1900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1900.

The processing circuitry 1902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1900 components, such as the memory 1904, to provide network node 1900 functionality.

In some embodiments, the processing circuitry 1902 includes a system on a chip (SOC). In some embodiments, the processing circuitry 1902 includes one or more of radio frequency (RF) transceiver circuitry 1912 and baseband processing circuitry 1914. In some embodiments, the radio frequency (RF) transceiver circuitry 1912 and the baseband processing circuitry 1914 may be on separate chips (or sets of chips), boards, or units, such as radio units and digital units. In alternative embodiments, part or all of RF transceiver circuitry 1912 and baseband processing circuitry 1914 may be on the same chip or set of chips, boards, or units.

The memory 1904 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1902. The memory 1904 may store any suitable instructions, data, or information, including a computer program, software, an application including one or more of logic, rules, code, tables, and/or other instructions capable of being executed by the processing circuitry 1902 and utilized by the network node 1900. The memory 1904 may be used to store any calculations made by the processing circuitry 1902 and/or any data received via the communication interface 1906. In some embodiments, the processing circuitry 1902 and memory 1904 is integrated.

The communication interface 1906 is used in wired or wireless communication of signaling and/or data between a network node, access network, and/or UE. As illustrated, the communication interface 1906 comprises port(s)/terminal(s) 1916 to send and receive data, for example to and from a network over a wired connection. The communication interface 1906 also includes radio front-end circuitry 1918 that may be coupled to, or in certain embodiments a part of, the antenna 1910. Radio front-end circuitry 1918 comprises filters 1920 and amplifiers 1922. The radio front-end circuitry 1918 may be connected to an antenna 1910 and processing circuitry 1902. The radio front-end circuitry may be configured to condition signals communicated between antenna 1910 and processing circuitry 1902. The radio front-end circuitry 1918 may receive digital data that is to be sent out to other network nodes or UEs via a wireless connection. The radio front-end circuitry 1918 may convert the digital data into a radio signal having the appropriate channel and bandwidth parameters using a combination of filters 1920 and/or amplifiers 1922. The radio signal may then be transmitted via the antenna 1910. Similarly, when receiving data, the antenna 1910 may collect radio signals which are then converted into digital data by the radio front-end circuitry 1918. The digital data may be passed to the processing circuitry 1902. In other embodiments, the communication interface may comprise different components and/or different combinations of components.

In certain alternative embodiments, the network node 1900 does not include separate radio front-end circuitry 1918, instead, the processing circuitry 1902 includes radio front-end circuitry and is connected to the antenna 1910. Similarly, in some embodiments, all or some of the RF transceiver circuitry 1912 is part of the communication interface 1906. In still other embodiments, the communication interface 1906 includes one or more ports or terminals 1916, the radio front-end circuitry 1918, and the RF transceiver circuitry 1912, as part of a radio unit (not shown), and the communication interface 1906 communicates with the baseband processing circuitry 1914, which is part of a digital unit (not shown).

The antenna 1910 may include one or more antennas, or antenna arrays, configured to send and/or receive wireless signals. The antenna 1910 may be coupled to the radio front-end circuitry 1918 and may be any type of antenna capable of transmitting and receiving data and/or signals wirelessly. In certain embodiments, the antenna 1910 is separate from the network node 1900 and connectable to the network node 1900 through an interface or port.

The antenna 1910, communication interface 1906, and/or the processing circuitry 1902 may be configured to perform any receiving operations and/or certain obtaining operations described herein as being performed by the network node. Any information, data and/or signals may be received from a UE, another network node and/or any other network equipment. Similarly, the antenna 1910, the communication interface 1906, and/or the processing circuitry 1902 may be configured to perform any transmitting operations described herein as being performed by the network node. Any information, data and/or signals may be transmitted to a UE, another network node and/or any other network equipment.

The power source 1908 provides power to the various components of network node 1900 in a form suitable for the respective components (e.g., at a voltage and current level needed for each respective component). The power source 1908 may further comprise, or be coupled to, power management circuitry to supply the components of the network node 1900 with power for performing the functionality described herein. For example, the network node 1900 may be connectable to an external power source (e.g., the power grid, an electricity outlet) via an input circuitry or interface such as an electrical cable, whereby the external power source supplies power to power circuitry of the power source 1908. As a further example, the power source 1908 may comprise a source of power in the form of a battery or battery pack which is connected to, or integrated in, power circuitry. The battery may provide backup power should the external power source fail.

Embodiments of the network node 1900 may include additional components beyond those shown in FIG. 19 for providing certain aspects of the network node's functionality, including any of the functionality described herein and/or any functionality necessary to support the subject matter described herein. For example, the network node 1900 may include user interface equipment to allow input of information into the network node 1900 and to allow output of information from the network node 1900. This may allow a user to perform diagnostic, maintenance, repair, and other administrative functions for the network node 1900.

Figure 20:
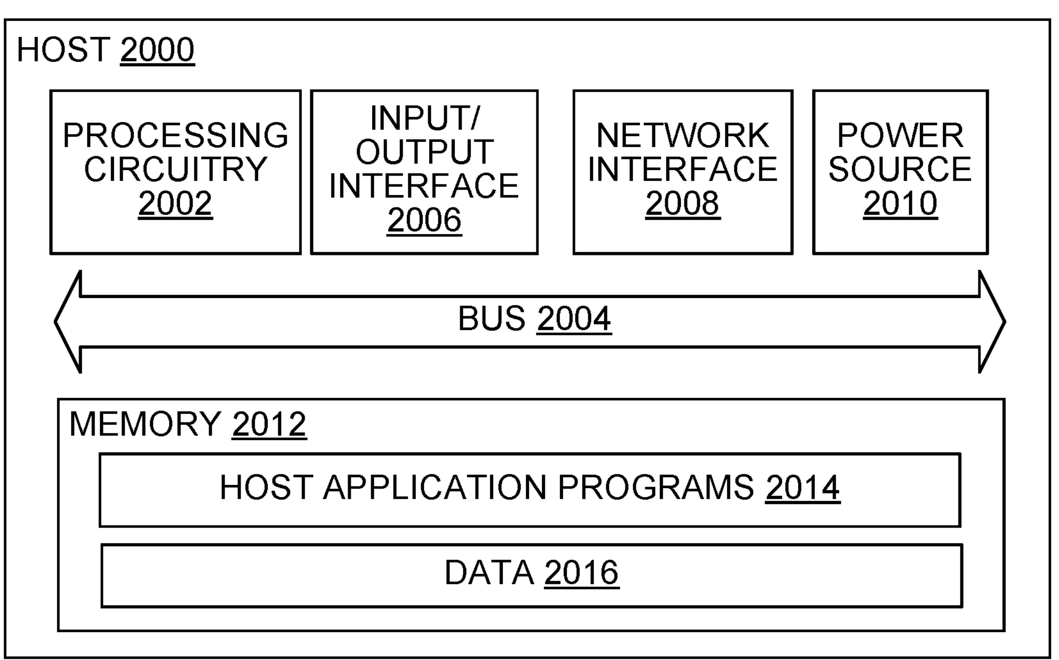
FIG. 20 is a block diagram of a host computer communicating with a user equipment in accordance with some embodiments.

FIG. 20 is a block diagram of a host 2100, which may be an embodiment of the host 1716 of FIG. 17, in accordance with various aspects described herein. As used herein, the host 2100 may be or comprise various combinations hardware and/or software, including a standalone server, a blade server, a cloud-implemented server, a distributed server, a virtual machine, container, or processing resources in a server farm. The host 2100 may provide one or more services to one or more UEs.

The host 2100 includes processing circuitry 2002 that is operatively coupled via a bus 2004 to an input/output interface 2006, a network interface 2008, a power source 2010, and a memory 2012. Other components may be included in other embodiments. Features of these components may be substantially similar to those described with respect to the devices of previous figures, such as FIGS. 18 and 19, such that the descriptions thereof are generally applicable to the corresponding components of host 2100.

The memory 2012 may include one or more computer programs including one or more host application programs 2014 and data 2016, which may include user data, e.g., data generated by a UE for the host 2100 or data generated by the host 2100 for a UE. Embodiments of the host 2100 may utilize only a subset or all of the components shown. The host application programs 2014 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 2014 may also provide for user authentication and licensing checks and may periodically report health, routes, and content availability to a central node, such as a device in or on the edge of a core network. Accordingly, the host 2100 may select and/or indicate a different host for over-the-top services for a UE. The host application programs 2014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 21:
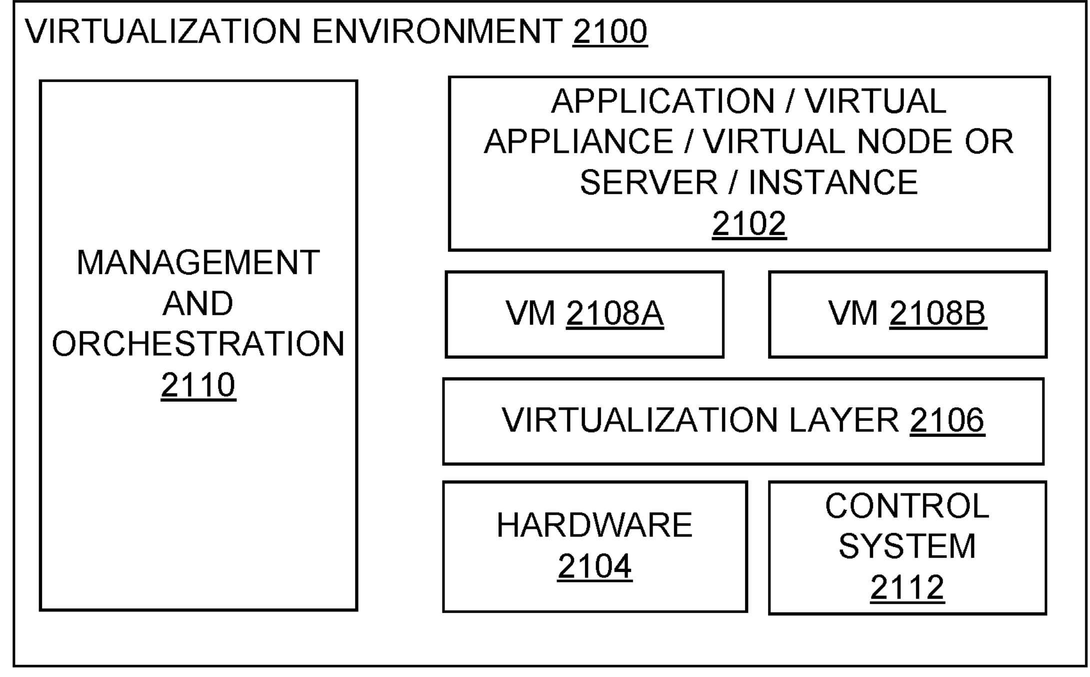
FIG. 21 is a block diagram of a virtualization environment in accordance with some embodiments.

FIG. 21 is a block diagram illustrating a virtualization environment 2200 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2200 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2102 (which may alternatively be called software instances, virtual appliances, network functions, virtual nodes, virtual network functions, etc.) are run in the virtualization environment Q500 to implement some of the features, functions, and/or benefits of some of the embodiments disclosed herein.

Hardware 2104 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 2106 (also referred to as hypervisors or virtual machine monitors (VMMs)), provide VMs 2108*a* and 2108*b* (one or more of which may be generally referred to as VMs 2108), and/or perform any of the functions, features and/or benefits described in relation with some embodiments described herein. The virtualization layer 2106 may present a virtual operating platform that appears like networking hardware to the VMs 2108.

The VMs 2108 comprise virtual processing, virtual memory, virtual networking or interface and virtual storage, and may be run by a corresponding virtualization layer 2106. Different embodiments of the instance of a virtual appliance 2102 may be implemented on one or more of VMs 2108, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2108 may be a software implementation of a physical machine that runs programs as if they were executing on a physical, non-virtualized machine. Each of the VMs 2108, and that part of hardware 2104 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2108 on top of the hardware 2104 and corresponds to the application 2102.

Hardware 2104 may be implemented in a standalone network node with generic or specific components. Hardware 2104 may implement some functions via virtualization. Alternatively, hardware 2104 may be part of a larger cluster of hardware (e.g. such as in a data center or CPE) where many hardware nodes work together and are managed via management and orchestration 2110, which, among others, oversees lifecycle management of applications 2102. In some embodiments, hardware 2104 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2112 which may alternatively be used for communication between hardware nodes and radio units.

Figure 22:
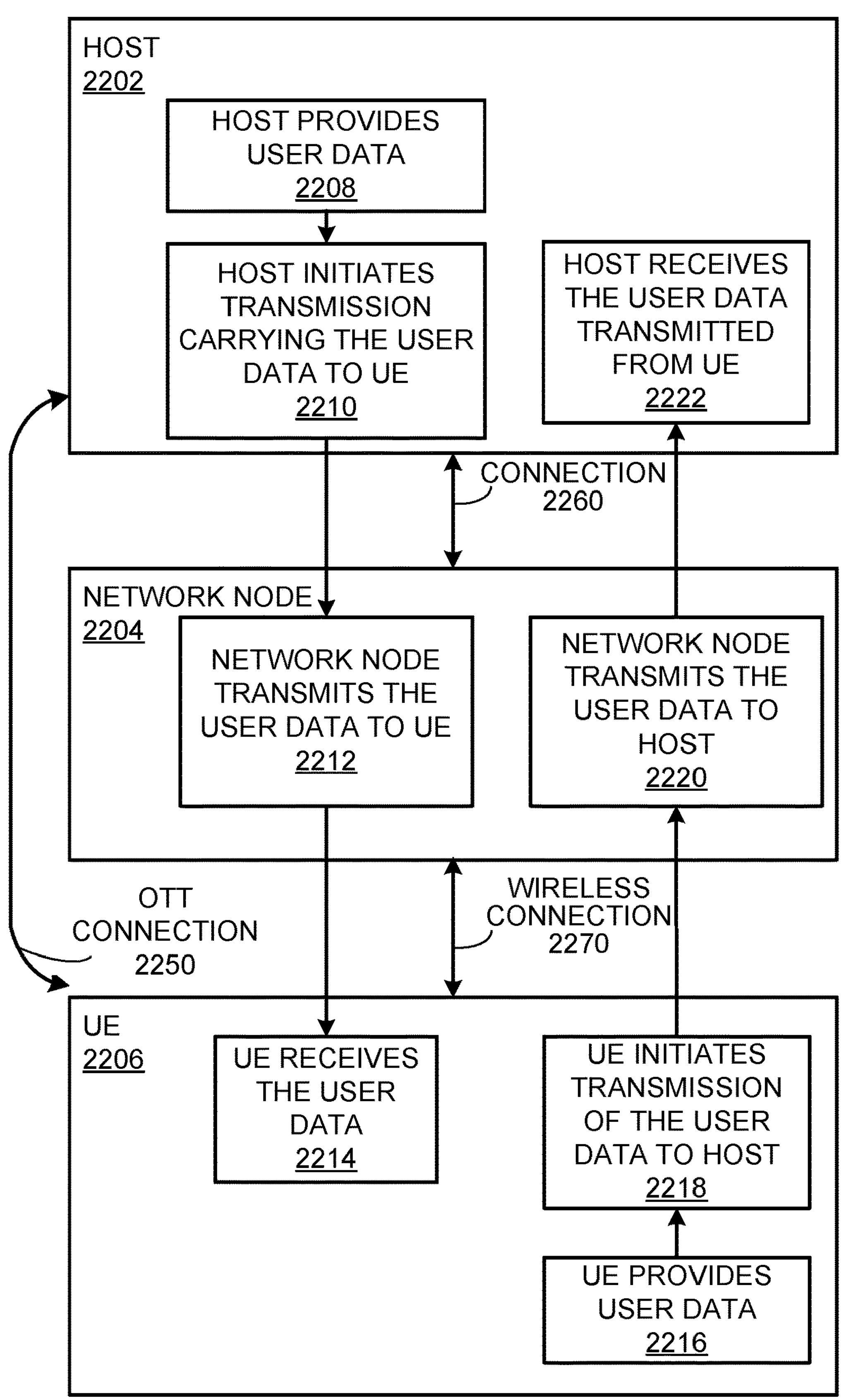
FIG. 22 is a block diagram of a host computer communicating via a base station with a user equipment over a partially wireless connection in accordance with some embodiments in accordance with some embodiments.

FIG. 22 shows a communication diagram of a host 2202 communicating via a network node 2204 with a UE 2206 over a partially wireless connection in accordance with some embodiments. Example implementations, in accordance with various embodiments, of the UE (such as a UE 1712*a* of FIG. 17 and/or UE 1800 of FIG. 18), network node (such as network node 1710*a* of FIG. 17 and/or network node 1900 of FIG. 19), and host (such as host 1716 of FIG. 17 and/or host 2100 of FIG. 20) discussed in the preceding paragraphs will now be described with reference to FIG. 22.

Like host 2100, embodiments of host 2202 include hardware, such as a communication interface, processing circuitry, and memory. The host 2202 also includes software, which is stored in or accessible by the host 2202 and executable by the processing circuitry. The software includes a host application that may be operable to provide a service to a remote user, such as the UE 2206 connecting via an over-the-top (OTT) connection 2250 extending between the UE 2206 and host 2202. In providing the service to the remote user, a host application may provide user data which is transmitted using the OTT connection 2250.

The network node 2204 includes hardware enabling it to communicate with the host 2202 and UE 2206. The connection 2260 may be direct or pass through a core network (like core network 1706 of FIG. 17) and/or one or more other intermediate networks, such as one or more public, private, or hosted networks. For example, an intermediate network may be a backbone network or the Internet.

The UE 2206 includes hardware and software, which is stored in or accessible by UE 2206 and executable by the UE's processing circuitry. The software includes a client application, such as a web browser or operator-specific "app" that may be operable to provide a service to a human or non-human user via UE 2206 with the support of the host 2202. In the host 2202, an executing host application may communicate with the executing client application via the OTT connection 2250 terminating at the UE 2206 and host 2202. In providing the service to the user, the UE's client application may receive request data from the host's host application and provide user data in response to the request data. The OTT connection 2250 may transfer both the request data and the user data. The UE's client application may interact with the user to generate the user data that it provides to the host application through the OTT connection 2250.

The OTT connection 2250 may extend via a connection 2260 between the host 2202 and the network node 2204 and via a wireless connection 2270 between the network node 2204 and the UE 2206 to provide the connection between the host 2202 and the UE 2206. The connection 2260 and wireless connection 2270, over which the OTT connection 2250 may be provided, have been drawn abstractly to illustrate the communication between the host 2202 and the UE 2206 via the network node 2204, without explicit reference to any intermediary devices and the precise routing of messages via these devices.

As an example of transmitting data via the OTT connection 2250, in step 2208, the host 2202 provides user data, which may be performed by executing a host application. In some embodiments, the user data is associated with a particular human user interacting with the UE 2206. In other embodiments, the user data is associated with a UE 2206 that shares data with the host 2202 without explicit human interaction. In step 2210, the host 2202 initiates a transmission carrying the user data towards the UE 2206. The host 2202 may initiate the transmission responsive to a request transmitted by the UE 2206. The request may be caused by human interaction with the UE 2206 or by operation of the client application executing on the UE 2206. The transmission may pass via the network node 2204, in accordance with the teachings of the embodiments described throughout this disclosure. Accordingly, in step 2212, the network node 2204 transmits to the UE 2206 the user data that was carried in the transmission that the host 2202 initiated, in accordance with the teachings of the embodiments described throughout this disclosure. In step 2214, the UE 2206 receives the user data carried in the transmission, which may be performed by a client application executed on the UE 2206 associated with the host application executed by the host 2202.

In some examples, the UE 2206 executes a client application which provides user data to the host 2202. The user data may be provided in reaction or response to the data received from the host 2202. Accordingly, in step 2216, the UE 2206 may provide user data, which may be performed by executing the client application. In providing the user data, the client application may further consider user input received from the user via an input/output interface of the UE 2206. Regardless of the specific manner in which the user data was provided, the UE 2206 initiates, in step 2218, transmission of the user data towards the host 2202 via the network node 2204. In step 2220, in accordance with the teachings of the embodiments described throughout this disclosure, the network node 2204 receives user data from the UE 2206 and initiates transmission of the received user data towards the host 2202. In step 2222, the host 2202 receives the user data carried in the transmission initiated by the UE 2206.

One or more of the various embodiments improve the performance of OTT services provided to the UE 2206 using the OTT connection 2250, in which the wireless connection 2270 forms the last segment.

In an example scenario, factory status information may be collected and analyzed by the host 2202. As another example, the host 2202 may process audio and video data which may have been retrieved from a UE for use in creating maps. As another example, the host 2202 may collect and analyze real-time data to assist in controlling vehicle congestion (e.g., controlling traffic lights). As another example, the host 2202 may store surveillance video uploaded by a UE. As another example, the host 2202 may store or control access to media content such as video, audio, VR or AR which it can broadcast, multicast or unicast to UEs. As other examples, the host 2202 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2250 between the host 2202 and UE 2206, in response to variations in the measurement results. The measurement procedure and/or the network functionality for reconfiguring the OTT connection may be implemented in software and hardware of the host 2202 and/or UE 2206. In some embodiments, sensors (not shown) may be deployed in or in association with other devices through which the OTT connection 2250 passes; the sensors may participate in the measurement procedure by supplying values of the monitored quantities exemplified above, or supplying values of other physical quantities from which software may compute or estimate the monitored quantities. The reconfiguring of the OTT connection 2250 may include message format, retransmission settings, preferred routing etc.; the reconfiguring need not directly alter the operation of the network node 2204. Such procedures and functionalities may be known and practiced in the art. In certain embodiments, measurements may involve proprietary UE signaling that facilitates measurements of throughput, propagation times, latency and the like, by the host 2202. The measurements may be implemented in that software causes messages to be transmitted, in particular empty or 'dummy' messages, using the OTT connection 2250 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Explanations are provided below for various abbreviations/acronyms used in the present disclosure.

ABBREVIATION EXPLANATION

UE User Equipment (Wireless device in 3GPP systems)
NR New Radio
LTE Long Term Evolution
gNB Base station in NR
eNB Base station in LTE
RRC Radio Resource Control
PDCP Packet Data Convergence Protocol
RLC Radio Link Control
MAC Medium Access Control
RAN Radio Access Network
IAB Integrated Access Backhaul
BH Backhaul
BAP Backhaul Adaptation Protocol
CU Central Unit
DU Digital Unit
MT Mobile Termination
PDU Packet Data Unit
DRB Data Radio Bearer
SRB Signalling Radio Bearer
SN Sequence Number

The invention claimed is:

1. A method performed by a first node comprising:
obtaining a configuration for performing backhaul integrity protection and verification for backhaul adaptation protocol (BAP) data protocol data unit (PDU) packets transmitted and/or received over a backhaul link;
computing a security token to be included in a BAP data PDU to be transmitted;
adding the security token in the BAP data PDU; and
transmitting the BAP data PDU with the security token towards a second IAB node, wherein obtaining the configuration comprises obtaining parameters for using in performing the backhaul integrity protection and verification, wherein adding the security token in the BAP data PDU comprises setting a field in a BAP header to indicate presence of the security token.

2. The method of claim 1, wherein obtaining the parameters comprises obtaining one or more of:
an identification (ID) of the backhaul (BH) radio link control (RLC) channel ID associated to the BAP PDU to be protected;
security keys comprising a root key and/or derived keys for integrity protection;
a D/C bit indicating if the PDU is a BAP Control PDU or a BAP Data PDU, one or more reserved bits (R) and a T bit to indicate presence/absence of a token field;
a refresh token for providing replay protection;
an IAB node destination identity of the BAP data PDU to be protected;
a path identity over which the BPA data PDU to be protected is transmitted; and
a security algorithm identity of a security algorithm to use for integrity protection, wherein computing a security token comprises computing the security token based on the security algorithm identity.

3. The method of claim 1, further comprising responsive to receiving a BAP data PDU having a security token to be forwarded to a next IAB node:
relaying the security token included in the BAP data PDU received to the next IAB node without modifying the security token, or
performing integrity protection verification on the BAP data PDU received.

4. The method of claim 3 wherein the BAP data PDU has multiple security tokens and performing integrity protection verification comprises performing integrity protection verification on a security token of the multiple security tokens meant for the IAB node.

5. The method of claim 3, wherein performing integrity protection verification comprises generating a token based on parameters associated to the BAP data PDU.

6. The method of claim 1, further comprising:
responsive to receiving a BAP data PDU for the IAB node, performing integrity protection verification on the BAP data PDU received.

7. The method of claim 3, further comprising:
responsive to the integrity protection verification results in determining that the BAP data PDU is not valid, discarding the BAP data PDU.

8. The method of claim 3, further comprising:
responsive to the integrity protection verification results in determining that the BAP data PDU is not valid, transmitting an indication to a central unit IAB node that the BAP data PDU has been declared as not valid due to an unsuccessful security protection verification.

9. The method of claim 3, further comprising:

responsive to the integrity protection verification results in determining that the BAP data PDU is not valid, performing a Radio Resource Control (RRC) connection reestablishment, and wherein performing the RRC connection reestablishment comprises performing the RRC connection reestablishment to an IAB node different from the one from which the BAP data PDU received that was determined to not be valid.

10. The method of claim 3, further comprising:

responsive to the integrity protection verification results in determining that the BAP data PDU is not valid, keeping a log of BAP data PDUs that are not valid and informing higher layers of the BAP data PDU that has been declared as not valid due to an unsuccessful security protection verification.

11. The method of claim 3, further comprising:

responsive to the integrity protection verification results in determining that the BAP data PDU is valid, removing the header, including the security token and forwarding content of the BAP data PDU to higher layers and to a transmitting entity if the BAP data PDU has to be relayed to a next hop.

12. A method performed by a central unit (CU) Integrated Access and Backhaul (IAB) node comprising:

receiving an indication from an IAB node;

responsive to the indication being of a received invalid BAP PDU caused by a second IAB node, performing at least one action to prevent the second IAB node from further attacks, wherein performing the at least one action comprises releasing a radio resource control (RRC) connection between the IAB node and the second IAB node, wherein performing the at least one CU IAB node action further comprises updating routing tables of IAB node such that the second IAB node is excluded from an IAB network topology, or releasing RRC connections and F1 connections of the second IAB node.

13. The method of claim 12, further comprising:

transmitting a configuration for performing backhaul integrity protection and verification for backhaul adaptation protocol (BAP) data protocol data unit (PDU) packets transmitted and/or received over a backhaul link to the IAB node.

14. The method of claim 12, wherein the second IAB node comprises an attacking IAB node.

15. A first node comprising:

processing circuitry; and memory coupled with the processing circuitry, wherein the memory includes instructions that when executed by the processing circuitry causes the first node to perform operations according to claim 1.

16. A Central Unit (CU) Integrated Access and Backhaul (IAB) node comprising:

processing circuitry; and memory coupled with the processing circuitry, wherein the memory includes instructions that when executed by the processing circuitry causes the CU IAB node to perform operations according to claim 12.

* * * * *